(12) United States Patent
Oguri

(10) Patent No.: US 10,087,997 B2
(45) Date of Patent: Oct. 2, 2018

(54) CLUTCH AND MOTOR

(71) Applicant: ASMO CO., LTD., Shizuoka-ken (JP)

(72) Inventor: Ryousuke Oguri, Hamamatsu (JP)

(73) Assignee: Denso Corporation, Kariya (JP)

( * ) Notice: Subject to any disclaimer, the term of this patent is extended or adjusted under 35 U.S.C. 154(b) by 115 days.

(21) Appl. No.: 15/194,852

(22) Filed: Jun. 28, 2016

(65) Prior Publication Data

US 2017/0009822 A1 Jan. 12, 2017

(30) Foreign Application Priority Data

Jul. 6, 2015 (JP) .................................. 2015-135304

(51) Int. Cl.
*F16D 41/066* (2006.01)
*F16D 43/02* (2006.01)

(52) U.S. Cl.
CPC ........... *F16D 41/066* (2013.01); *F16D 43/02* (2013.01); *F16D 2300/06* (2013.01); *F16D 2300/22* (2013.01)

(58) Field of Classification Search
CPC ...... F16D 41/066; F16D 41/067; F16D 43/02; F16D 2300/06; F16D 2300/22
See application file for complete search history.

(56) References Cited

U.S. PATENT DOCUMENTS

| | | | |
|---|---|---|---|
| 4,782,931 A * | 11/1988 | Lederman | F16D 13/72 192/113.32 |
| 5,482,150 A * | 1/1996 | Stark | F16D 41/067 192/45.012 |
| 6,481,550 B2 * | 11/2002 | Yamamoto | F16D 15/00 192/44 |
| 6,575,277 B1 * | 6/2003 | Torii | E05F 11/505 192/12 B |
| 8,708,125 B2 * | 4/2014 | Yamashita | F16D 43/02 192/223.2 |

(Continued)

FOREIGN PATENT DOCUMENTS

JP 2001336550 A 12/2001

OTHER PUBLICATIONS

Definition of "Abut", retrieved from www.oxforddictionaries.com on Dec. 19, 2017.*

*Primary Examiner* — Stacey A Fluhart
(74) *Attorney, Agent, or Firm* — Patterson Thuente Pedersen, P.A.

(57) ABSTRACT

A clutch transmits rotation drive force of a rotation shaft to a driven shaft and restricts transmission of a rotation force from the driven shaft to the rotation shaft. The clutch includes a grease accommodation portion and a rotation member. Grease is arranged in the grease accommodation portion. The grease accommodation portion opens in an axial direction of the rotation shaft. The rotation member is at least partially inserted into the grease accommodation portion and rotated with the rotation shaft about a center axis of the rotation shaft. The rotation member includes a leakage restriction wall that is located toward a radially outer side of the rotation shaft from the opening of the grease accommodation portion and extended in the axial direction of the rotation shaft. The leakage restriction wall is located toward an outer side of the grease accommodation portion from the opening of the grease accommodation portion.

18 Claims, 9 Drawing Sheets

(56) References Cited

U.S. PATENT DOCUMENTS

2002/0011390 A1* 1/2002 Yamamoto .............. F16D 15/00
  192/38
2004/0099498 A1* 5/2004 Kurita .................. B60N 2/1615
  192/12 B

* cited by examiner

CLUTCH AND MOTOR

BACKGROUND OF THE INVENTION

The present invention relates to a clutch and a motor.

Japanese Laid-Open Patent Publication No. 2001-336550 describes an example of a motor used for a power window or the like installed in a vehicle. The motor includes a motor unit, which has a rotation shaft that is rotated and driven, and an output unit, which has a worm to which the rotation of the rotation shaft is transmitted and which outputs the rotation transmitted to the worm. A clutch (coupling portion) connects the rotation shaft and the worm. The clutch functions to transmit rotation drive force of the rotation shaft to the worm and not to transmit rotation force from the worm to the rotation shaft.

The clutch includes a coupling member that rotates integrally with the rotation shaft, a driven rotor that is rotatable integrally with the worm and engageable with the coupling member in the rotation direction, and a tubular clutch housing into which the coupling member and the driven rotor are inserted. Further, rollers are arranged between an inner circumferential surface of the clutch housing and the driven rotor. The rollers restrict rotation of the worm when held by the inner circumferential surface of the clutch housing and the driven rotor when the rotation shaft is not rotated and driven. The rollers are supported by a support inserted into the clutch housing. When the rotation shaft is rotated and driven, the support is pushed by the coupling member in the rotation direction and rotated with the rotation shaft.

Grease is applied to a predetermined portion of the clutch such as the inner circumferential surface of the clutch housing so that the clutch operates smoothly. In the clutch, since the coupling member and the support are inserted into the clutch housing, the grease applied to the inner circumferential surface of the clutch housing may collect on the coupling member and the support. Further, the coupling member and the support rotate with the rotation shaft when driven and rotated. Thus, the grease that collects on the coupling member and the support may be moved to the radially outer side by centrifugal force and leak through an opening of the clutch housing out of the clutch. When grease leaks out of the clutch in such a manner, the amount of grease becomes insufficient. This adversely affects the operation of the clutch. For example, when restricting rotation from the worm, it may be difficult to hold the rollers between the inner circumferential surface of the clutch housing and the driven rotor (that is, rollers slip on inner circumferential surface of clutch housing).

SUMMARY OF THE INVENTION

It is an object of the present invention to provide a clutch and a motor that restricts leakage of grease out of a coupling portion.

To achieve the above object, a clutch according to one aspect of the present invention transmits rotation drive force of a rotation shaft to a driven shaft and restricts transmission of a rotation force from the driven shaft to the rotation shaft. The clutch includes a grease accommodation portion and a rotation member. Grease is arranged in the grease accommodation portion. The grease accommodation portion opens in an axial direction of the rotation shaft. The rotation member is at least partially inserted into the grease accommodation portion and rotated with the rotation shaft about a center axis of the rotation shaft. The rotation member includes a leakage restriction wall that is located toward a radially outer side of the rotation shaft from the opening of the grease accommodation portion and extended in the axial direction of the rotation shaft. The leakage restriction wall is located toward an outer side of the grease accommodation portion from the opening of the grease accommodation portion.

A motor according to a further aspect of the present invention includes a motor unit, an output unit, and a coupling portion. The motor unit includes a rotation shaft that is driven and rotated. The output unit includes a driven shaft to which rotation drive force of the rotation shaft is transmitted. The output unit externally outputs the rotation drive force transmitted to the driven shaft. The coupling portion includes a grease accommodation portion and a rotation member. Grease is arranged in the grease accommodation portion. The grease accommodation portion opens in an axial direction of the rotation shaft. The coupling portion couples the rotation shaft to the driven shaft to transmit the rotation drive force of the rotation shaft to the driven shaft. The rotation member includes a leakage restriction wall that is located toward a radially outer side of the rotation shaft from the opening of the grease accommodation portion and extended in the axial direction of the rotation shaft. The leakage restriction wall is located toward an outer side of the grease accommodation portion from the opening of the grease accommodation portion.

DETAILED DESCRIPTION OF THE PREFERRED EMBODIMENTS

One embodiment of a motor will now be described.

Figure 1:
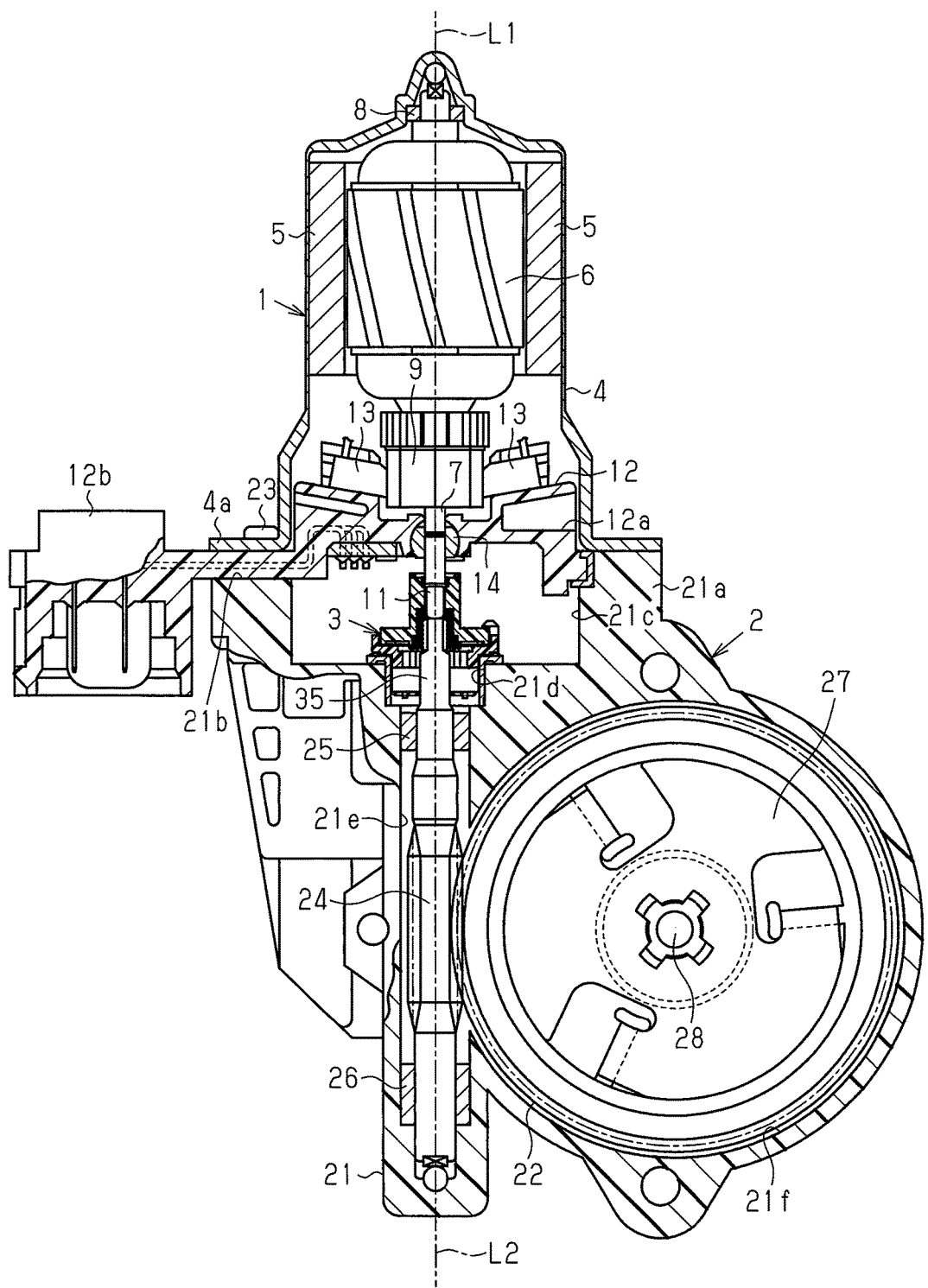
FIG. 1 is a cross-sectional view showing a motor according to one embodiment of the present invention.

As shown in FIG. 1, a motor includes a motor unit 1, an output unit 2, and a clutch 3 serving as a coupling portion.

The motor of the present embodiment is fixed to a vehicle with the output unit 2 located closer to the ground than the motor unit 1.

Two magnets 5 are opposed to each other and fixed to an inner circumferential surface of a tubular yoke 4 of the motor unit 1, which has a closed end. An armature 6 is arranged at the inner sides of the magnets 5. The armature 6 includes a rotation shaft 7 located at a central portion of the yoke 4. The rotation shaft 7 includes a basal portion (upper end in FIG. 1), supported by a bearing 8 that is arranged at the center of the closed end of the yoke 4, and a distal portion, to which a tubular commutator 9 is fixed.

Figure 2:
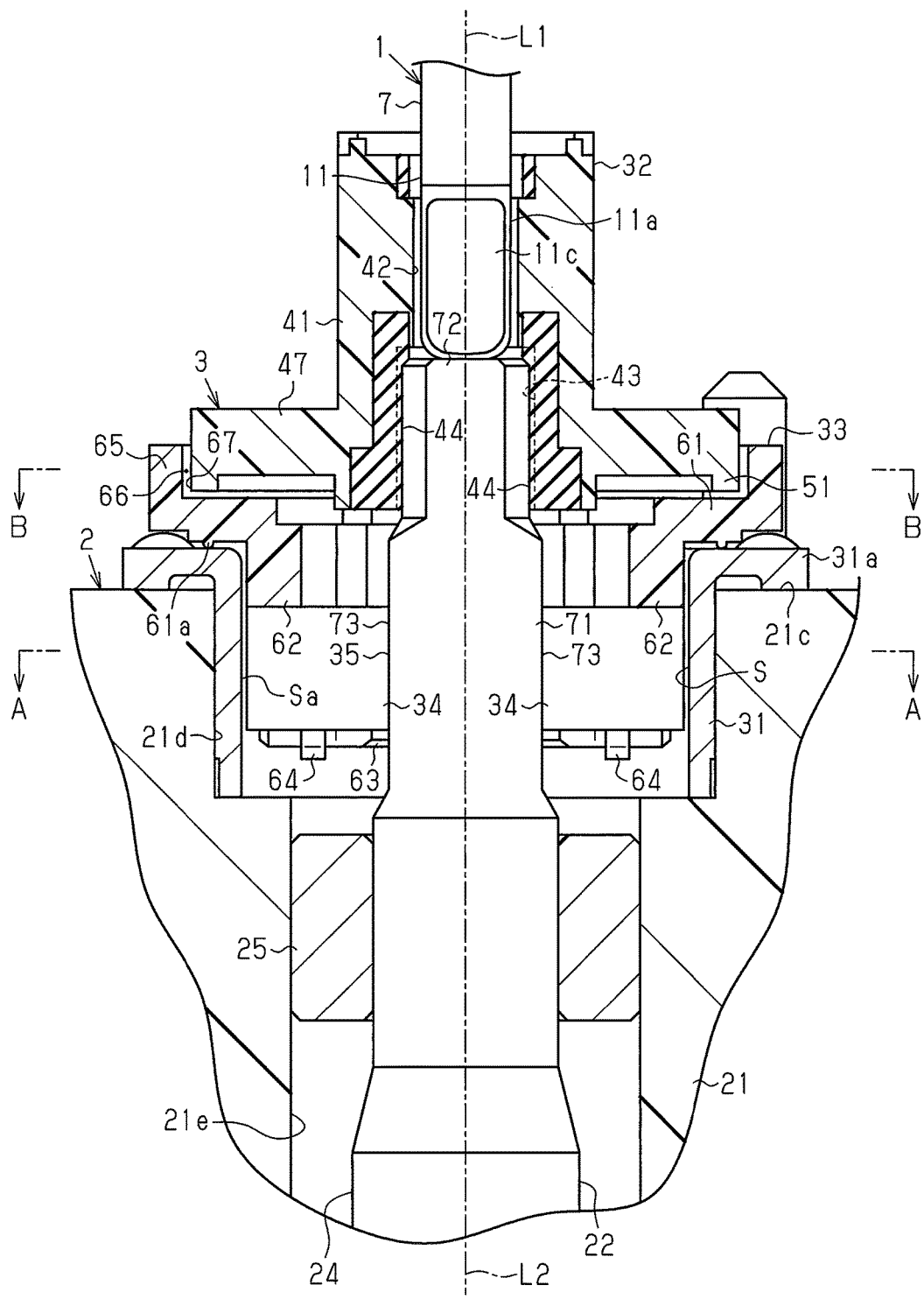
FIG. 2 is a partial, enlarged cross-sectional view of the motor shown in FIG. 1.
Figure 3:
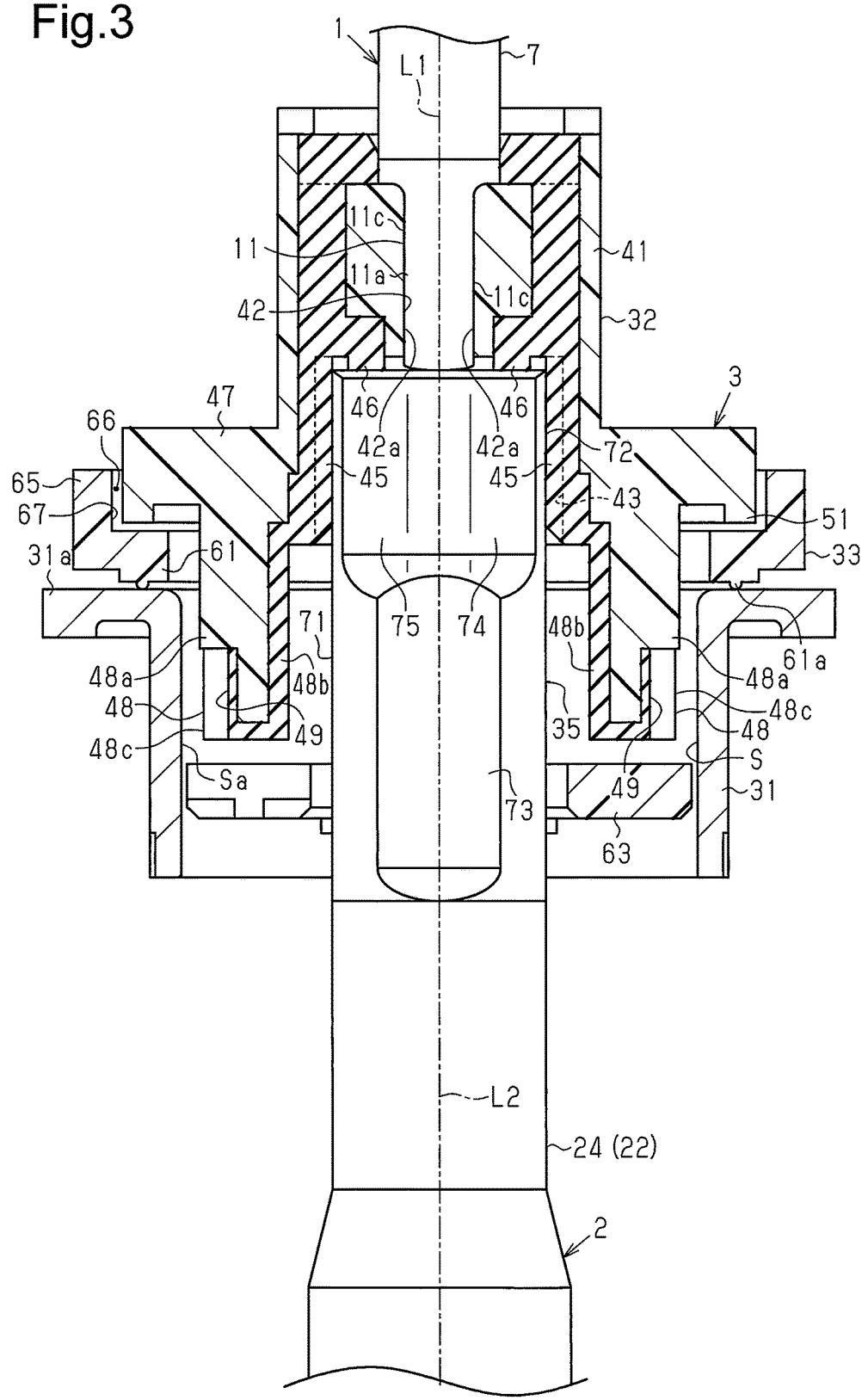
FIG. 3 is a partial, enlarged cross-sectional view of the motor shown in FIG. 1.

As shown in FIGS. 2 and 3, a drive insertion portion 11 is defined by the distal portion of the rotation shaft 7. The drive insertion portion 11 includes a double-plane portion 11a, which is the remaining portion of the distal portion of the cylindrical rotation shaft 7 that is chamfered in parallel. The double-plane shape means a shape having two flat surfaces extending in parallel to each other. The two lateral end surfaces of the double-plane portion 11a serve as rotation transmission surfaces 11c, which are flat surfaces that are parallel to each other and extend in the axial direction.

As shown in FIG. 1, a flange 4a extends toward the outside from an end that is closer to an opening of the yoke 4. Further, a brush holder 12 is fitted into the opening of the yoke 4. The brush holder 12 is integrally formed by a holder body 12a and a connector 12b. The holder body 12a is shaped to close the opening of the yoke 4. The connector 12b projects toward the radially outer side of the yoke 4. The holder body 12a holds two brushes 13 that are connected to the connector 12b by wires (not shown) and slide in contact with the commutator 9. Further, a bearing 14 paired with the bearing 8 is arranged at a central portion of the holder body 12a. The bearing 14 supports a portion of the rotation shaft 7 that is located between the commutator 9 and the drive insertion portion 11. When external power supplied via the connector 12b to the brushes 13 is supplied via the commutator 9 to the armature 6, the armature 6 (rotation shaft 7) is rotated and driven, that is, the motor unit 1 is rotated and driven.

The output unit 2 includes a reduction drive 22 or the like, which is accommodated in a resin gear housing 21. The gear housing 21 includes a fixed portion 21a having the same shape as the flange 4a of the yoke 4. The fixed portion 21a is located at a portion opposing the motor unit 1 in the axial direction (upper end in FIG. 1). The fixed portion 21a includes a fitting recess 21b that opens toward the inner side of the yoke 4. When the brush holder 12 is fitted into the fitting recess 21b, the fixed portion 21a and the flange 4a that abuts against the fixed portion 21a are fixed by a screw 23. Thus, the yoke 4 is fixed to the gear housing 21 to integrate the motor unit 1 with the output unit 2.

The gear housing 21 includes a first clutch accommodation recess 21c and a second clutch accommodation recess 21d. The first clutch accommodation recess 21c extends in the axial direction at a middle bottom of the fitting recess 21b, and the second clutch accommodation recess 21d, which has a smaller diameter than the first clutch accommodation recess 21c, extends in the axial direction at a middle bottom of the first clutch accommodation recess 21c. Further, the gear housing 21 includes a worm accommodation portion 21e extending from a middle bottom of the second clutch accommodation recess 21d in the axial direction of the rotation shaft 7. A cylindrical worm 24 serving as a driven shaft is accommodated in the worm accommodation portion 21e. The worm 24 is supported by two bearings 25 and 26 that are respectively arranged at the two axial ends of the worm accommodation portion 21e. Thus, the worm 24 is arranged coaxially with the rotation shaft 7 (that is, arranged so that center axis L1 of rotation shaft 7 and center axis of worm 24 are located on the same line).

In addition, the gear housing 21 includes a gear accommodation portion 21f that is in communication with the worm accommodation portion 21e in the direction orthogonal to the axis of a middle part of the worm accommodation portion 21e (right direction in FIG. 1). The gear accommodation portion 21f includes a circular worm wheel 27 that engages the worm 24. The worm wheel 27 and the worm 24 form the reduction drive 22. An output shaft 28, which extends in the axial direction of the worm wheel 27 (direction orthogonal to plane of FIG. 1) from a radially central part of the worm wheel 27, rotates integrally with the worm wheel 27.

The first clutch accommodation recess 21c and the second clutch accommodation recess 21d accommodate the clutch 3 that couples the rotation shaft 7 to the worm 24 and transmits rotation drive force of the rotation shaft 7 to the worm 24. As shown in FIG. 2, the clutch 3 includes a clutch housing 31, a coupling member 32 serving as a rotation member and a first rotation member, a support 33 serving as a rotation member and a second rotation member, rollers 34, and a driven rotor 35.

The clutch housing 31 is tubular. A fixing flange 31a extends toward the radially outer side from one axial end of the clutch housing 31. The clutch housing 31 is inserted into the second clutch accommodation recess 21d so that the fixing flange 31a contacts a bottom surface of the first clutch accommodation recess 21c, and the fixing flange 31a is fixed to the bottom of the first clutch accommodation recess 21c. The clutch housing 31 is fixed to the gear housing 21 so that the clutch housing 31 is immovable in the axial direction and non-rotatable in the circumferential direction. The clutch housing 31 fixed to the gear housing 21 is arranged coaxially with the rotation shaft 7 and the worm 24.

Figure 7A:
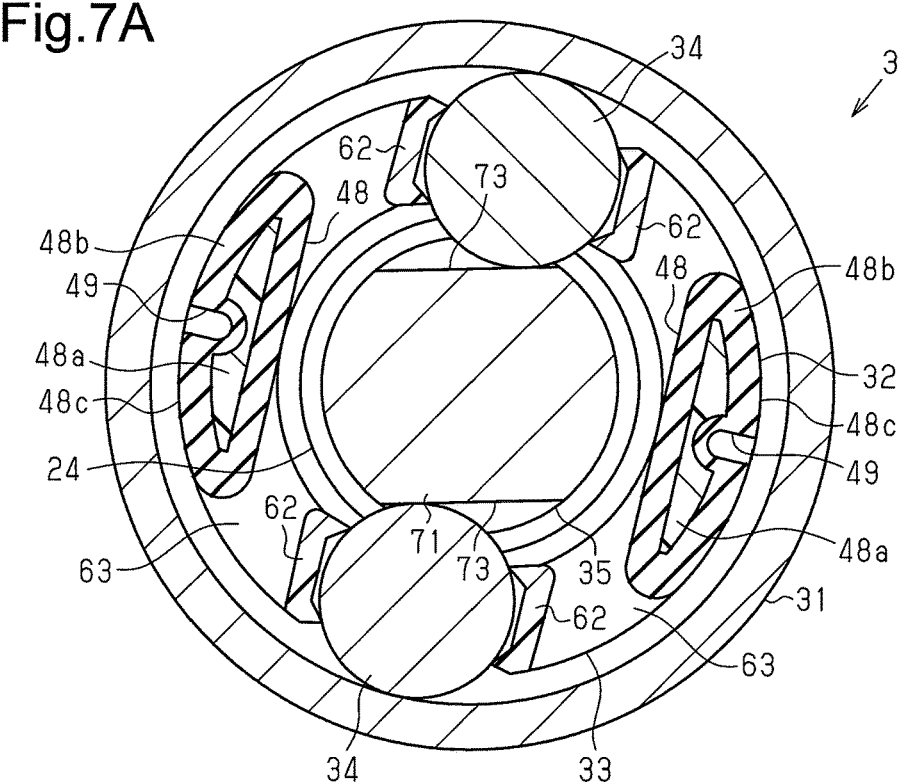
FIG. 7A is a cross-sectional view taken along line A-A in FIG. 2.
Figure 7B:
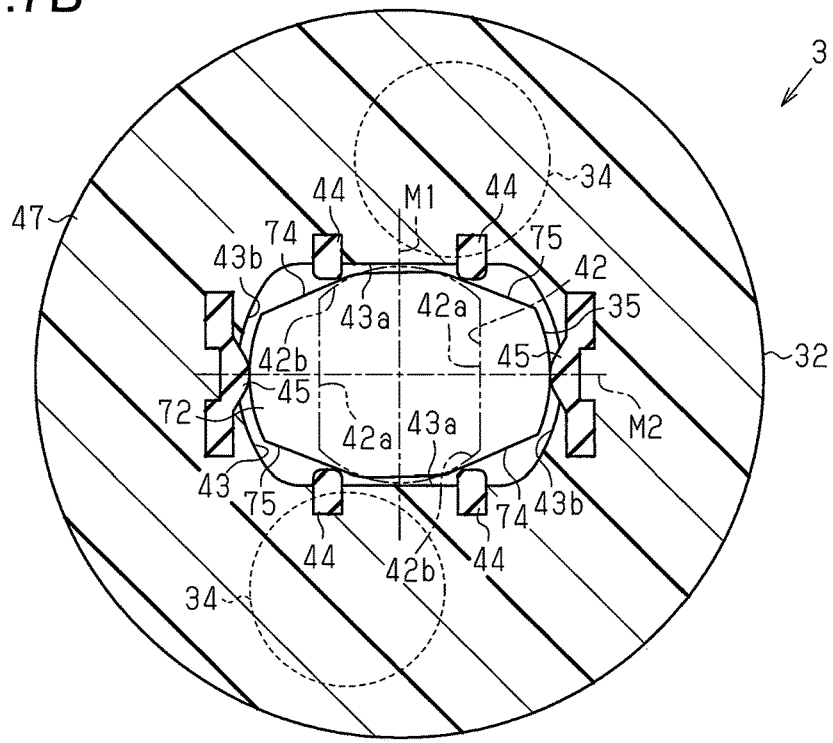
FIG. 7B is a cross-sectional view taken along line B-B in FIG. 2.

The coupling member 32 includes a cylindrical shaft coupling portion 41 having an outer diameter that is smaller than the inner diameter of the clutch housing 31. A radially central part of the shaft coupling portion 41 includes a drive shaft insertion hole 42 that extends in the axial direction. The drive shaft insertion hole 42 extends from one axial end of the shaft coupling portion 41, which is closer to the motor unit 1 (upper end in FIG. 2), to an axially central part of the shaft coupling portion 41. The drive shaft insertion hole 42 has a double-plane shape as viewed in the axial direction and extends in a longitudinal direction and a lateral direction. As shown in FIG. 7BB, the inner circumferential surface of the drive shaft insertion hole 42 includes two parallel surfaces 42a that are separated in the radial direction and parallel to the axial direction and two arcuate connecting surfaces 42b that connect the two ends of the flat surfaces 42a to each other. In the drive shaft insertion hole 42, as viewed from the axial direction, the direction parallel to the flat surfaces 42a (vertical direction in FIG. 7B) is the longitudinal direction, and the direction orthogonal to the flat surfaces 42a (sideward direction in FIG. 7B) is the lateral direction. Further, the distance between the two flat surfaces 42a of the drive shaft insertion hole 42 is substantially the same as the width between the two rotation transmission surfaces 11c of the double-plane portion 11a (refer to FIG. 3). In addition, as viewed in the axial direction, the length of the drive shaft insertion hole 42 in the direction parallel to the flat surfaces 42a is larger than the length of the double-plane portion 11a in the direction parallel to the rotation transmission surfaces 11c (refer to FIG. 2).

As shown in FIGS. 2 and 3, the drive insertion portion 11 of the rotation shaft 7 is inserted into the drive shaft insertion hole 42. The two rotation transmission surfaces 11c of the double-plane portion 11a of the drive insertion portion 11 inserted into the drive shaft insertion hole 42 oppose the two flat surfaces 42a. The opposing rotation transmission surfaces 11c of the double-plane portion 11a abut against the opposing plane surfaces 42a of the drive shaft insertion hole 42. The rotation transmission surfaces 11c and the flat surfaces 42a abut against each other and thus engage each other in the rotation direction. This allows for integral rotation of the drive insertion portion 11 and the coupling member 32.

As shown in FIG. 2, a driven shaft insertion hole 43 extends in the axial direction from the radially central part of the shaft coupling portion 41. The driven shaft insertion hole 43 extends from the other end of the shaft coupling portion 41, which is closer to the output unit 2 (lower end in FIG. 2), to the axially central part of the shaft coupling portion 41. The driven shaft insertion hole 43 is in communication with the drive shaft insertion hole 42. As shown in FIG. 7B, the driven shaft insertion hole 43 has a double-plane shape as viewed in the axial direction and extends in the longitudinal direction and the lateral direction. The inner circumferential surface of the driven shaft insertion hole 43 includes two drive transmission surfaces 43a that are separated in the radial direction and parallel to each other and two connecting surfaces 43b that connect the two ends of the drive transmission surfaces 43a to each other. In the driven shaft insertion hole 43, as viewed in the axial direction, the direction parallel to the drive transmission surfaces 43a (sideward direction in FIG. 7B) is the longitudinal direction, and the direction orthogonal to the drive transmission surfaces 43a (vertical direction in FIG. 7B) is the lateral direction. Further, the center axis of the driven shaft insertion hole 43 corresponds to the center axis of the drive shaft insertion hole 42. In addition, the driven shaft insertion hole 43 is shifted by 90° in the rotation direction of the coupling member 32 (same as rotation direction of rotation shaft 7) relative to the drive shaft insertion hole 42. That is, the longitudinal direction of the driven shaft insertion hole 43 is shifted by 90° in the rotation direction of the coupling member 32 relative to the longitudinal direction of the drive shaft insertion hole 42. Thus, as shown in FIG. 7B, when the coupling member 32 is viewed in the axial direction, the center line M1 of the drive shaft insertion hole 42 extending in the longitudinal direction through the center of the lateral direction of the drive shaft insertion hole 42 is orthogonal to the center line M2 of the driven shaft insertion hole 43 extending in the longitudinal direction through the center of the lateral direction of the driven shaft insertion hole 43.

Further, dampers 44, each formed from an elastic member of rubber or the like, are arranged on each of the drive transmission surfaces 43a. The dampers 44 extend in the axial direction at two portions of each drive transmission surface 43a that are separated in the direction of the center line M2 of the driven shaft insertion hole 43. Each of the dampers 44 slightly further projects toward the inner side of the driven shaft insertion hole 43 than the drive transmission surfaces 43a. The positions of the drive transmission surface 43a where the dampers 44 are arranged correspond to the positions where first driven transmission surfaces 74 and second driven transmission surfaces 75 (described below) abut against the drive transmission surfaces 43a.

Further, a driven elastic member 45, which is formed from an elastic member of rubber or the like, is arranged on each of the connecting surfaces 43b of the driven shaft insertion hole 43. The driven elastic member 45 extends in the axial direction at the circumferentially central part of each connecting surface 43b. In addition, each driven elastic member 45 further projects toward the inner side of the driven shaft insertion hole 43 than each connecting surface 43b.

As shown in FIG. 3, axial dampers 46, each formed from an elastic member of rubber or the like, are arranged at the axial end of the driven shaft insertion hole 43 that is closer to the drive shaft insertion hole 42. The axial dampers 46 are located at the radially outer side of the drive shaft insertion hole 42 at the axial end of the driven shaft insertion hole 43 that is closer to the drive shaft insertion hole 42. The axial dampers 46 project in the axial direction toward the inner side of the driven shaft insertion hole 43.

An annular flange 47 extending toward the radially outer side is integrally formed at the axial end of the shaft coupling portion 41 that is closer to the driven shaft insertion hole 43. The outer diameter of the flange 47 is larger than the inner diameter of the clutch housing 31 and smaller than the outer diameter of the clutch housing 31.

The flange 47 includes two roller release units 48 serving as rotation transmission units. The two roller release units 48 are respectively formed at the two sides of the longitudinal direction (same as direction of center line M2 in FIG. 7B) of the driven shaft insertion hole 43 and extended in the axial direction from the flange 47 toward the side opposite to the drive shaft insertion hole 42.

Figure 4:
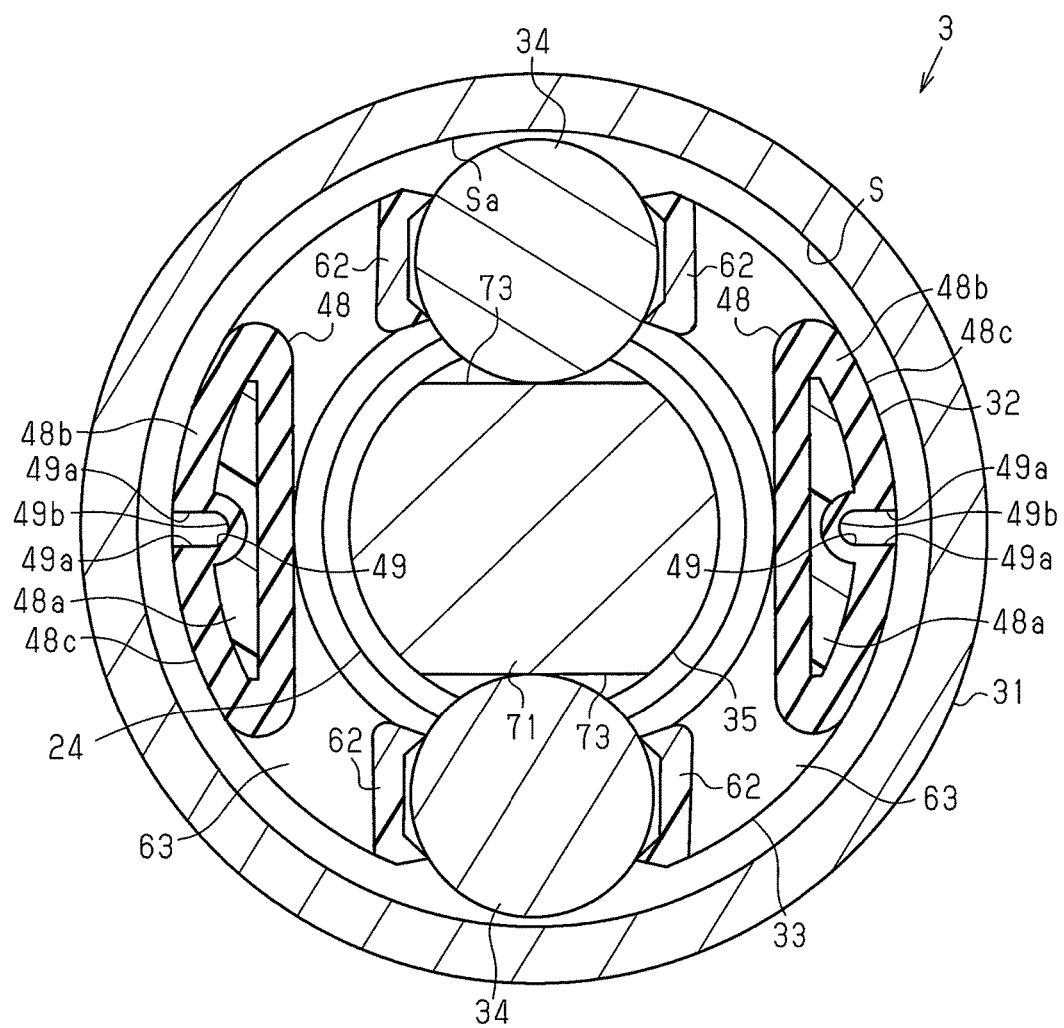
FIG. 4 is a cross-sectional view taken along line A-A in FIG. 2.

Each roller release unit 48 includes a power transmission portion 48a and an impact absorption member 48b. The power transmission portion 48a is formed integrally with the flange 47 and extended in the axial direction from the flange 47. The impact absorption member 48b is formed from an elastic member of rubber or the like and molded integrally with the front surface of the power transmission portion 48a. As shown in FIGS. 3 and 4, in each roller release unit 48, the impact absorption member 48b covers the radially inner side surface of the power transmission portion 48a, the two circumferential side surfaces, and the portion of the radially outer side surface that is closer to the distal end of the power transmission portion 48a. In the same manner as the impact absorption members 48b, the dampers 44 (refer to FIG. 2), the driven elastic members 45, and the axial dampers 46 are molded integrally with the portions of the coupling member 32 that are formed from resin materials other than those used for the impact absorption members 48b, the dampers 44, the driven elastic members 45, and the axial dampers 46. As viewed in the axial direction, each roller release unit 48 is D-shaped such that the radially outer side surface (that is, radially outer side surface 48c) is arcuate and the radially inner side surface is flat.

An accommodation groove 49 is formed in the radially outer side surface 48c, which is the radially outer side surface, of each roller release unit 48. Each accommodation groove 49 extends straight in the axial direction from the distal end of the roller release unit 48 toward the basal end of the roller release unit 48. In the present embodiment, each accommodation groove 49 is formed at the circumferentially central part of each radially outer side surface 48c. Further, each accommodation groove 49 is formed at the portion of the radially outer side surface 48c of each roller release unit 48 where the power transmission portion 48a is arranged. Each accommodation groove 49 has a U-shaped cross section that is orthogonal to the axial direction that opens toward the radially outer side. More specifically, the inner side surface of each accommodation groove 49 includes two flat surfaces 49*a* that are circumferentially separated from and parallel to each other and an arcuate surface 49*b* that connects the ends of the radially inner sides of the paired flat surfaces 49*a*. The portion of each accommodation groove 49 that includes the two flat surfaces 49*a* has a fixed circumferential width.

As shown in FIGS. 2 and 3, a coupling member leakage restriction wall 51 serving as a leakage restriction wall and a first leakage restriction wall is formed integrally with the outer edge of the flange 47 of the coupling member 32. The coupling member leakage restriction wall 51 is extended in the axial direction and located toward the radially outer side of the rotation shaft 7 from the opening of the clutch housing 31 that is closer to the coupling member 32 (opening toward motor unit 1). The coupling member leakage restriction wall 51 is extended in the axial direction toward the clutch housing 31 and formed at the outer edge of the flange 47 in the axial end surface that is closer to the clutch housing 31 (lower end surface in FIGS. 2 and 3). The coupling member leakage restriction wall 51 is located toward the outer side of the clutch housing 31 in the axial direction of the rotation shaft 7 from the opening of the clutch housing 31 that is closer to the coupling member 32. Further, the coupling member leakage restriction wall 51 is formed continuously over the entire circumference of the flange 47 and has an annular shape that is formed continuously in the circumferential direction of the rotation shaft 7. The inner diameter of the coupling member leakage restriction wall 51 is larger than the inner diameter of the clutch housing 31, and the outer diameter of the coupling member leakage restriction wall 51 is smaller than the outer diameter of the fixing flange 31*a* of the clutch housing 31.

In the coupling member 32, the shaft coupling portion 41 and the flange 47 are located outside the clutch housing 31 (more specifically, located between clutch housing 31 and brush holder 12), and the distal portions of the two roller release units 48 are inserted into the clutch housing 31. The radially outer side surface 48*c* of each roller release unit 48 arranged inside the clutch housing 31 opposes the inner circumferential surface of the clutch housing 31 in the radial direction.

As shown in FIGS. 2 and 4, the support 33 includes an annular ring 61 that is formed from a resin material and serves as an axial continuous portion. The ring 61 is located closer to the motor unit 1 (upper side in FIG. 2) than the fixing flange 31*a* of the clutch housing 31 and opposed to the fixing flange 31*a* in the axial direction. The outer diameter of the ring 61 is larger than the outer diameter of the flange 47 of the coupling member 32 and smaller than the outer diameter of the fixing flange 31*a* of the clutch housing 31. Further, the ring 61 includes an abutment portion 61*a* extending in the axial direction from the axial end surface of the ring 61 opposing the fixing flange 31*a*. The abutment portion 61*a* is formed in an annular manner in the circumferential direction of the ring 61. The abutment portion 61*a* abuts against the fixing flange 31*a* in the direction from the motor unit 1 to the fixing flange 31*a*. Thus, the ring 61 is continuous in the axial direction with the fixing flange 31*a* arranged at the open end of the clutch housing 31 that is closer to the motor unit 1. That is, the ring 61 is continuous in the axial direction with the opening of the clutch housing 31 that is closer to the motor unit 1.

Two pairs of roller supports 62 are respectively arranged at two locations that are separated in the circumferential direction of the ring 61 (in the present embodiment, two locations that are separated by 180°). The two roller supports 62 in each pair are extended in the axial direction from the inner edge of the ring 61 and separated from each other in the circumferential direction. Further, the distal portions of the two pairs of the roller supports 62 are coupled by reinforcement portions 63 extending in an arcuate manner. In addition, a holding tab 64 extends between the distal portions of the roller supports 62 in each pair (extends in circumferential direction).

The rollers 34 are respectively fitted into the two pairs of the roller supports 62 of the support 33. Each roller 34 is cylindrical and arranged between the two roller supports 62 of each pair. The rollers 34 are held by the paired supports 33 to be rotatable (rotatable about center axis of roller 34) and generally parallel at equal angular intervals (in the present embodiment, 180°). Further, the holding tab 64 prevents separation of each roller 34 from the support 33.

Figure 8A:
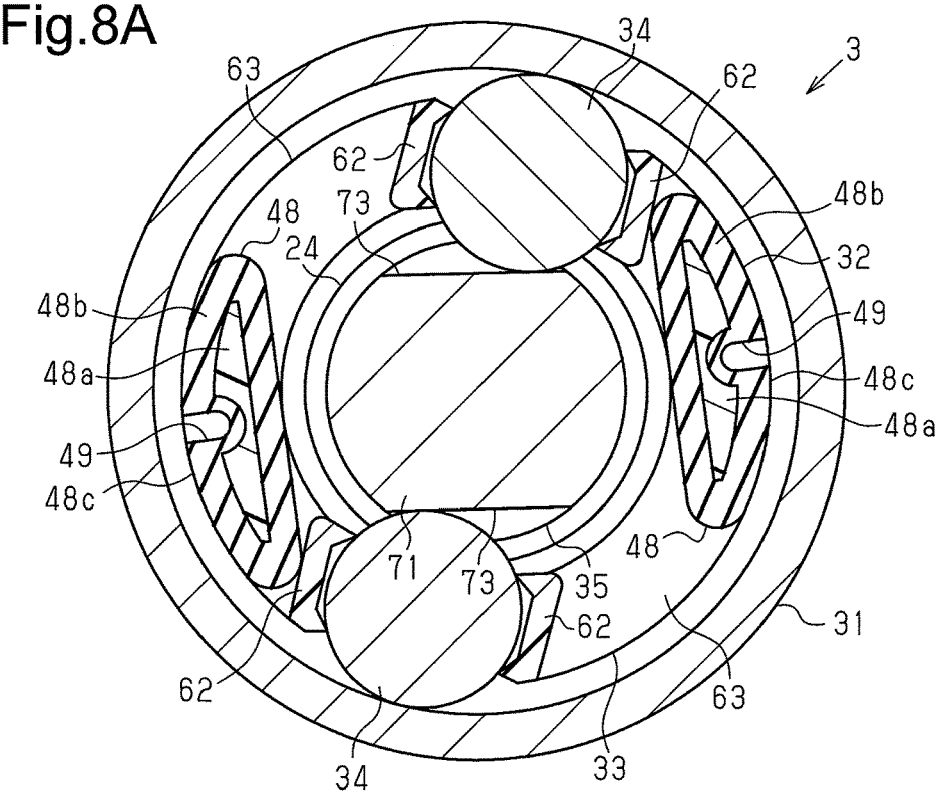
FIG. 8A is a cross-sectional view taken along line A-A in FIG. 2.

The roller supports 62, into which the rollers 34 are inserted, are inserted into the clutch housing 31. The two roller release units 48 of the coupling member 32 are inserted into the clutch housing 31 through the inner side of the ring 61 and respectively located between the two pairs of the roller supports 62. Further, the reinforcement portion 63 of the support 33 is located in the clutch housing 31 at a position closer to the axial end of the clutch housing 31 that is opposite to the fixing flange 31*a* than the distal portion of the roller release unit 48 and opposed to the distal portion of the roller release unit 48 in the axial direction. The support 33 and the coupling member 32 are rotatable relative to each other in the circumferential direction. As shown in FIGS. 7A and 8A, when the coupling member 32 rotates relative to the support 33, each roller release unit 48 can be abut from the rotation direction of the coupling member 32 (circumferential direction) against the roller support 62 that is located at the front side in the rotation direction of the coupling member 32. Further, the outer circumferential surfaces of the rollers 34 arranged inside the clutch housing 31 can be abut against the inner circumferential surface of the clutch housing 31.

Figure 5:
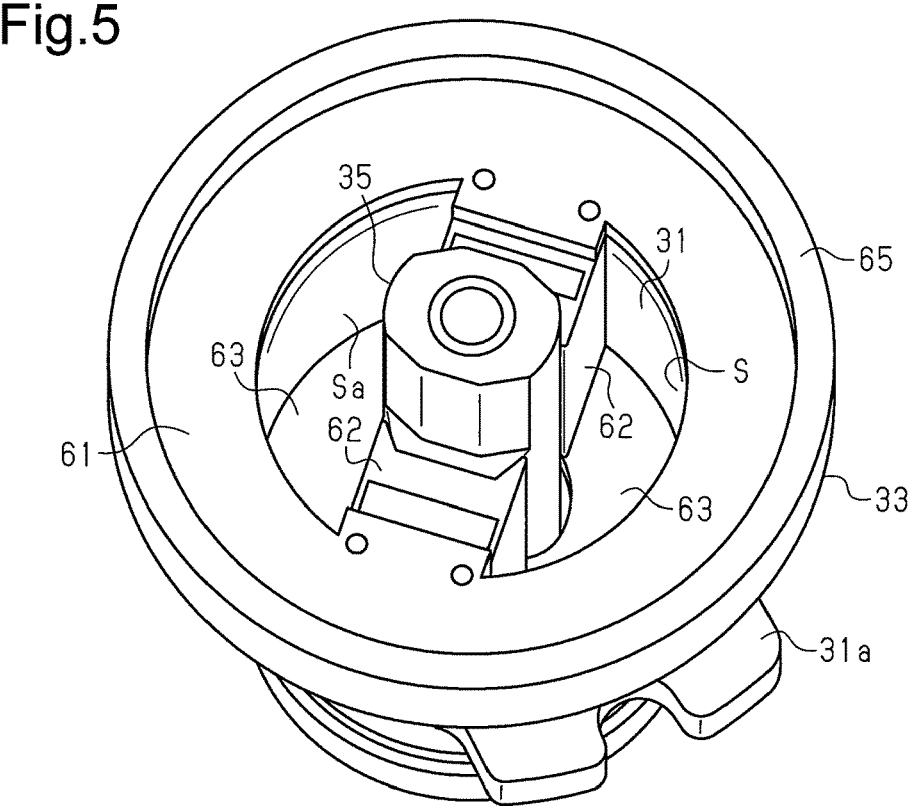
FIG. 5 is a perspective view of a clutch housing, a support, and a driven rotor shown in FIG. 2.

As shown in FIGS. 3 and 5, a support leakage restriction wall 65 serving as a leakage restriction wall and a second leakage restriction wall is formed integrally with the outer edge of the ring 61 of the support 33. The support leakage restriction wall 65 is extended in the axial direction and located toward the radially outer side of the rotation shaft 7 from the opening of the clutch housing 31 that is closer to the coupling member 32 (opening toward motor unit 1). The support leakage restriction wall 65 projects in the axial direction from the outer edge of the ring 61 away from the fixing flange 31*a* (that is, direction toward motor unit 1, upper side in FIG. 2). The support leakage restriction wall 65 is located in the axial direction of the rotation shaft 7 toward the outer side of the clutch housing 31 from the opening of the clutch housing 31 that is closer to the coupling member 32. Further, the support leakage restriction wall 65 is formed continuously over the entire circumference of the ring 61 and has an annular shape that is continuous with the circumferential direction of the rotation shaft 7. The inner diameter of the support leakage restriction wall 65 is larger than the inner diameter of the clutch housing 31 and slightly larger than the outer diameter of the coupling member leakage restriction wall 51. The coupling member leakage restriction wall 51 is inserted into the support leakage restriction wall 65 so that the coupling member leakage restriction wall 51 overlaps the support leakage restriction wall 65 in the radial direction. Further, the distal end of the coupling member leakage restriction wall 51 (distal end surface in axial direction) opposes the ring 61 in the axial direction and is proximate to the ring 61 at the radially inner side of the support leakage restriction wall 65. The motor of the present embodiment is fixed to the vehicle with the output unit 2 located closer to the ground than the motor unit 1 (refer to FIG. 1). Thus, the support leakage restriction wall 65 projects toward the upper side in the axial direction (direction opposite to ground) of the rotation shaft 7.

Figure 6:
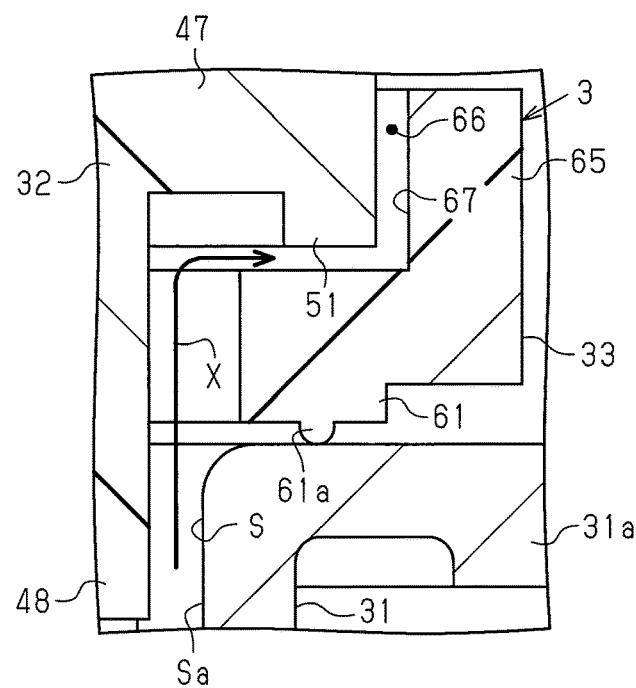
FIG. 6 is a partial, enlarged cross-sectional view of the motor shown in FIG. 2.

As shown in FIGS. 3 and 6, the coupling member leakage restriction wall 51 and the support leakage restriction wall 65 project in opposite directions, and the coupling member leakage restriction wall 51 is inserted into the support leakage restriction wall 65. Further, the inner circumferential surface of the support leakage restriction wall 65 is proximate to the outer circumferential surface of the coupling member leakage restriction wall 51 spaced apart by a gap, and the ring 61 with which the support leakage restriction wall 65 is integrally formed is proximate to the distal end of the coupling member leakage restriction wall 51 spaced apart by a gap. Thus, the support leakage restriction wall 65 (and ring 61) and the coupling member leakage restriction wall 51 form a labyrinth structure 67 including a clearance 66, which has an L-shaped cross-section that is orthogonal to the circumferential direction of the rotation shaft 7.

As shown in FIGS. 2 and 3, the driven rotor 35 is formed at the basal end of the worm 24. The driven rotor 35 includes a driven control portion 71 and a driven insertion portion 72, which are arranged next to each other in the axial direction.

The driven control portion 71 has a cylindrical shape extending from the basal end of the worm 24 in the axial direction of the worm 24. The center axis of the driven control portion 71 corresponds to the center axis L2 of the worm 24 and is coaxial with the worm 24. Further, the outer diameter of the driven control portion 71 is smaller than or equal to the maximum outer diameter of the worm 24. In the present embodiment, the outer diameter of the driven control portion 71 is equal to the outer diameter of the portion of the worm 24 that is supported by the bearing 25. As shown in FIG. 7A, two control surfaces 73 are formed in the outer circumferential surface of the driven control portion 71. The two control surfaces 73 are respectively located at two positions of the outer circumferential surface of the driven control portion 71 in the circumferential direction at equal angular intervals (in the present embodiment, intervals of) 180°. Further, the two control surfaces 73 are flat and parallel to each other in the axial direction. In addition, the two control surfaces 73, which are parallel to each other, are longer in the axial direction than the rollers 34.

As shown in FIG. 2, the driven insertion portion 72 is formed integrally with the axial end of the driven control portion 71 that is opposite to the axially central part of the worm 24. That is, the driven insertion portion 72 is closer to the basal end of the worm 24 than the driven control portion 71. The driven insertion portion 72 and the driven control portion 71 are formed continuously in the axial direction. The driven insertion portion 72 has a cylindrical shape extending in the axial direction of the worm 24. The center axis of the driven insertion portion 72 corresponds to the center axis L2 of the worm 24, and the driven insertion portion 72 is coaxial with the worm 24. Further, the outer diameter of the driven insertion portion 72 is smaller than or equal to the maximum outer diameter of the worm 24. In the present embodiment, the outer diameter of the driven insertion portion 72 is smaller than the outer diameter of the portion of the worm 24 that is supported by the bearing 25 (that is, smaller than outer diameter of driven control portion 71). In addition, the driven insertion portion 72 is slightly narrower than the driven shaft insertion hole 43.

As shown in FIG. 7B, the driven insertion portion 72 has an oval cross-section that is orthogonal to the axial direction and continuous in the axial direction. Further, as shown in FIGS. 7A and 7B, when the driven insertion portion 72 is viewed in the axial direction, the longitudinal direction of the driven insertion portion 72 (sideward direction in FIG. 7B) is parallel to the control surfaces 73, and the lateral direction of the driven insertion portion 72 (vertical direction in FIG. 7B) is orthogonal to the control surfaces 73.

As shown in FIG. 7B, two first driven transmission surfaces 74 and two second driven transmission surfaces 75 are defined in the outer circumferential surface of the driven insertion portion 72. One of the two paired first driven transmission surfaces 74 is located 180° opposite to the other first driven transmission surface 74. The two first driven transmission surfaces 74, which are parallel to each other, each have a flat shape that is parallel to the axial direction. Further, the distance between the two first driven transmission surfaces 74 is equal to the distance between the two drive transmission surfaces 43a of the driven shaft insertion hole 43 of the coupling member 32. The two second driven transmission surfaces 75 are respectively located between the two first driven transmission surfaces 74, and one of the two second driven transmission surfaces 75 is located at the opposite side of the other second driven transmission surface 75 by 180°. The two second driven transmission surfaces 75, which are parallel to each other, each have a flat shape that is parallel to the axial direction. Further, the distance between the two second driven transmission surfaces 75 is equal to the distance between the two drive transmission surfaces 43a of the driven shaft insertion hole 43. The first driven transmission surfaces 74 and the second driven transmission surfaces 75 extend in the axial direction from one axial end of the driven insertion portion 72 to the other axial end of the driven insertion portion 72.

As shown in FIGS. 2 and 7A, the driven rotor 35 is inserted into the clutch housing 31 and the support 33 from the side opposite to the coupling member 32. The driven insertion portion 72 is inserted into the driven shaft insertion hole 43 of the coupling member 32, and the driven control portion 71 is located between the two rollers 34 that are held by the support 33. Further, the driven rotor 35 is coaxial with the clutch housing 31, the coupling member 32, and the support 33.

As shown in FIGS. 3 and 7B, the driven insertion portion 72 is loosely fitted into the driven shaft insertion hole 43 so that the driven insertion portion 72 is rotatable integrally with the coupling member 32. In the coupling member 32, the distal end surface of the driven insertion portion 72 (that is, basal end surface of worm 24) abuts against the distal end surface of the drive insertion portion 11, which is inserted into the drive shaft insertion hole 42, from the axial direction. Further, the axial dampers 46 abut against the distal end surface of the driven insertion portion 72 from the axial direction. In addition, the driven elastic members 45 and the dampers 44 are located between the outer circumferential surface of the driven insertion portion 72 and the inner circumferential surface of the driven shaft insertion hole 43, which are opposed to each other in the radial direction. In the driven shaft insertion hole 43, the two driven elastic members 45 are in contact with the driven insertion portion 72 from the two longitudinal sides of the driven shaft insertion hole 43. The four dampers 44 are located between the two first driven transmission surfaces 74 or the two second driven transmission surfaces 75 and the drive transmission surfaces 43a.

When the coupling member 32 rotates about the center axis relative to the driven rotor 35, in accordance with the rotation direction of the coupling member 32, the drive transmission surfaces 43a abut against the opposing one of the first driven transmission surfaces 74 and the second driven transmission surfaces 75 from the rotation direction. Under this situation, the drive transmission surfaces 43a elastically deform the dampers 44, which are located between the drive transmission surfaces 43a and the first driven transmission surfaces 74 or the second driven transmission surfaces 75, and abut against the first driven transmission surfaces 74 or the second driven transmission surfaces 75 that are located at the front side in the rotation direction of the drive transmission surfaces 43a. When either one of the first driven transmission surfaces 74 and the second driven transmission surfaces 75 abuts against and engages the drive transmission surfaces 43a in the rotation direction, which are located at the two lateral ends of the driven shaft insertion hole 43, the driven insertion portion 72 becomes rotatable integrally with the coupling member 32. That is, the coupling member 32 engages the driven rotor 35 in the rotation direction so that the rotation drive force of the coupling member 32 is transmitted to the driven rotor 35. Since the drive insertion portion 11 of the rotation shaft 7 is inserted into the coupling member 32, the worm 24 including the driven insertion portion 72 and the rotation shaft 7 are coupled by the coupling member 32 in an integrally rotatable manner.

As shown in FIG. 7A, the driven control portion 71 is inserted into the support 33 so that the rollers 34 are respectively located between the control surfaces 73 and the inner circumferential surface of the clutch housing 31. The distance of each control surface 73 to the inner circumferential surface of the clutch housing 31 (distance in direction orthogonal to control surface 73) changes in the rotation direction of the driven rotor 35. In the present embodiment, the distance of each control surface 73 to the inner circumferential surface of the clutch housing 31 is the longest in the circumferential center of each control surface 73 and gradually decreases from the circumferential center of each control surface 73 toward the two circumferential ends. Further, the distance of the circumferential center of each control surface 73 to the inner circumferential surface of the clutch housing 31 is larger than the outer diameter of the roller 34, and the distance of the circumferential end of each control surface 73 and the inner circumferential surface of the clutch housing 31 is smaller than the outer diameter of each roller 34.

As shown in FIGS. 3 and 5, the clutch 3 of the present embodiment includes a grease accommodation portion S in which grease is arranged. The grease accommodation portion S of the present embodiment is located in the clutch housing 31 and closer to the fixing flange 31a than the reinforcement portions 63. The grease accommodation portion S includes an inner circumferential surface Sa that is formed in the inner circumferential surface of the clutch housing 31. Thus, the inner circumferential surface Sa of the grease accommodation portion S has a tubular shape that is directed toward the radially inner side. Further, the grease accommodation portion S includes an opening of the clutch housing 31 that is the opening of the fixing flange 31a and extends in the axial direction toward the motor unit 1 (opens toward upper side in FIG. 3). In addition, the bottom of the grease accommodation portion S is formed by the reinforcement portions 63 that are located between the inner circumferential surface of the clutch housing 31 and the outer circumferential surface of the driven rotor 35 near the axial end of the clutch housing 31 located at the side opposite to the fixing flange 31a.

Grease is applied to (arranged on) the inner circumferential surface Sa of the grease accommodation portion S (that is, portion of inner circumferential surface of clutch housing 31 closer to fixing flange 31a than reinforcement portions 63). Further, grease is arranged on the axial end surface of each reinforcement portion 63 of the support 33 that is closer to the coupling member 32 (that is, surface of each reinforcement portion 63 that is located closer to coupling member 32 and exposed to inner side of clutch housing 31). The grease of the present embodiment increases the sliding friction between the inner circumferential surface of the clutch housing 31 and the rollers 34.

The method for manufacturing the motor of the present embodiment will now be described. The description centers on a process for coupling the clutch 3.

The clutch housing 31 is first inserted into the second clutch accommodation recess 21d of the gear housing 21, and the fixing flange 31a is fixed to the bottom surface of the first clutch accommodation recess 21c. Thus, the clutch housing 31 is fixed to the gear housing 21. The worm 24 is accommodated in the worm accommodation portion 21e of the gear housing 21, and the driven rotor 35 is located in the first clutch accommodation recess 21c and the second clutch accommodation recess 21d.

Next, the support 33 that holds the rollers 34 is inserted into the clutch housing 31 from the fixing flange 31a. The roller supports 62 and the reinforcement portions 63 are inserted into the clutch housing 31, and the abutment portion 61a of the ring 61 abuts against the fixing flange 31a from the axial direction.

Then, grease is arranged on the inner surface of the grease accommodation portion S (grease arranging process). In the present embodiment, grease is applied to the portion of the inner circumferential surface of the clutch housing 31 that is closer to the fixing flange 31a than the reinforcement portions 63, and grease is arranged on the axial end surfaces of the reinforcement portions 63 that are closer to the fixing flange 31a.

Subsequently, the coupling member 32 is inserted into the grease accommodation portion S (insertion process). The distal portions of the roller release units 48 are passed through the inner side of the ring 61 and arranged inside the clutch housing 31 so that the roller release units 48 are arranged between the two pairs of roller supports 62. When the roller release units 48 are inserted into the clutch housing 31, the grease arranged on the reinforcement portions 63 and the grease applied to the inner circumferential surface of the clutch housing 31 is introduced to the accommodation groove 49 of each roller release unit 48 from the distal end of the roller release unit 48. Further, when the coupling member 32 is inserted into the clutch housing 31, the driven insertion portion 72 is inserted into the driven shaft insertion hole 43 and the coupling member leakage restriction wall 51 is arranged at the radially inner side of the support leakage restriction wall 65. This forms the clutch 3.

Then, the drive insertion portion 11 of the rotation shaft 7 is inserted into the drive shaft insertion hole 42 of the coupling member 32, and the motor unit 1 is arranged on the gear housing 21. Subsequently, the motor unit 1 is fixed to the output unit 2 to form the motor.

The operation of the motor will now be described. The description centers on the operation of the clutch 3.

As shown in FIG. 1, when the motor unit 1 is stopped, that is, when the rotation shaft 7 and the coupling member 32 are not rotated and driven, load is applied to the output shaft 28 from a load element connected to the output shaft 28. The load acts to rotate the driven rotor 35 (worm 24). Then, as shown in FIG. 7A, each control surface 73 of the driven rotor 35 pushes the rollers 34, which are located between each control surface 73 and the inner circumferential surface of the clutch housing 31, toward the outer circumference. FIG. 7A shows the clutch 3 when the driven rotor 35 acts to rotate in the counterclockwise direction. The rollers 34 pushed by the control surface 73 are moved between the two roller supports 62 of the corresponding pairs toward the outer circumference and abuts against the inner circumferential surface of the clutch housing 31. The control surfaces 73 hold the rollers 34 with the inner circumferential surface of the clutch housing 31. The grease (not shown) applied to the inner circumferential surface of the clutch housing 31 increases the sliding friction between the inner circumferential surface of the clutch housing 31 and the rollers 34. This reduces slipping of the rollers 34 on the inner circumferential surface of the clutch housing 31. Thus, the rollers 34 are easily held between the inner circumferential surface of the clutch housing 31 and the control surfaces 73. Since the clutch housing 31 is non-rotatable in the circumferential direction, the clutch housing 31 and the rollers 34 restrict further rotation of the driven rotor 35. This restricts rotation of the worm 24 and thus limits a situation in which the worm 24 rotates the rotation shaft 7. The portion of each control surface 73 that abuts against the corresponding roller 34 is located closer to the circumferential end of the control surface 73 than the circumferential center of the control surface 73. FIG. 7A shows the driven rotor 35 that acts to rotate in the counterclockwise direction. However, even when the driven rotor 35 acts to rotate in the clockwise direction, the rotation is restricted in the same manner.

Figure 8B:
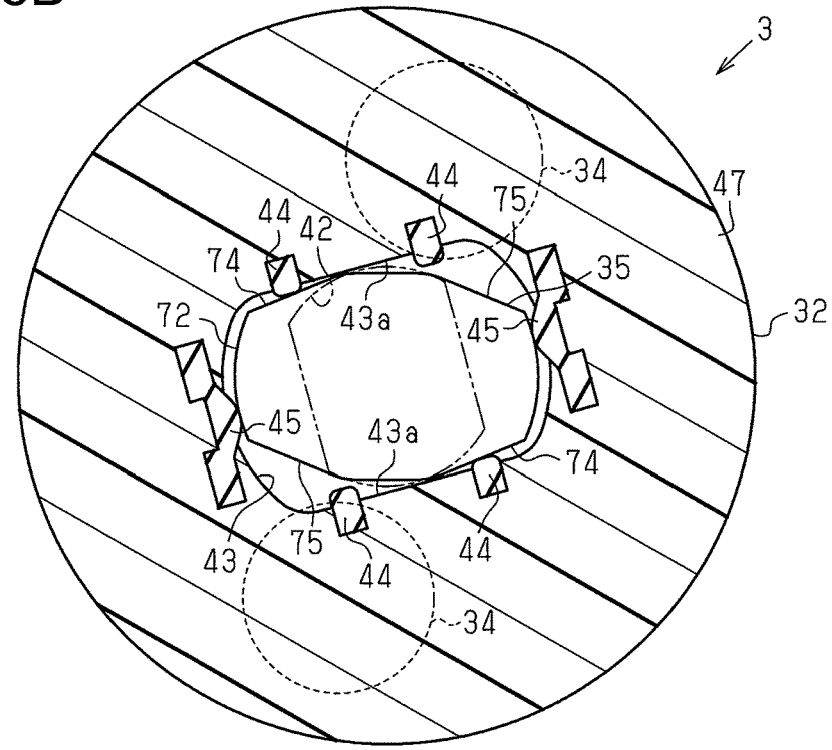
FIG. 8B is a cross-sectional view taken along line B-B in FIG. 2.

When the motor unit 1 is driven, that is, when the rotation shaft 7 is rotated and driven, as shown in FIGS. 8A and 8B, the coupling member 32 rotates integrally with the rotation shaft 7 about the center axis L1 of the rotation shaft 7 (refer to FIG. 2). FIGS. 8A, 8B, 9A, and 9B each show the clutch 3 when the rotation shaft 7 and the coupling member 32 are rotated and driven in the counterclockwise direction. The coupling member 32 is rotated relative to the stopped support 33, and each roller release unit 48 of the coupling member 32 abuts against the roller supports 62 located at the front side in the rotation direction of each roller release unit 48 and pushes the roller supports 62 in the rotation direction. This releases the holding of the rollers 34, which are held by the roller supports 62, from between the clutch housing 31 and the control surfaces 73. Thus, the driven rotor 35 is unlocked. The drive transmission surfaces 43a of the coupling member 32 do not abut against the first driven transmission surfaces 74 of the driven rotor 35. This keeps the driven rotor 35 stopped.

Figure 9A:
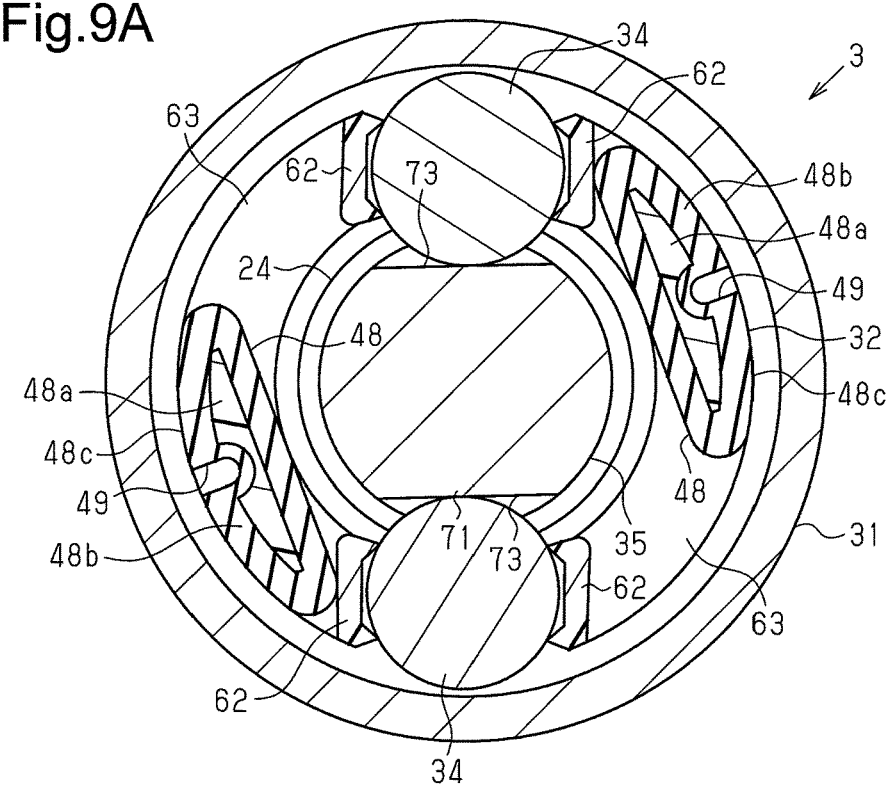
FIG. 9A is a cross-sectional view taken along line A-A in FIG. 2.
Figure 9B:
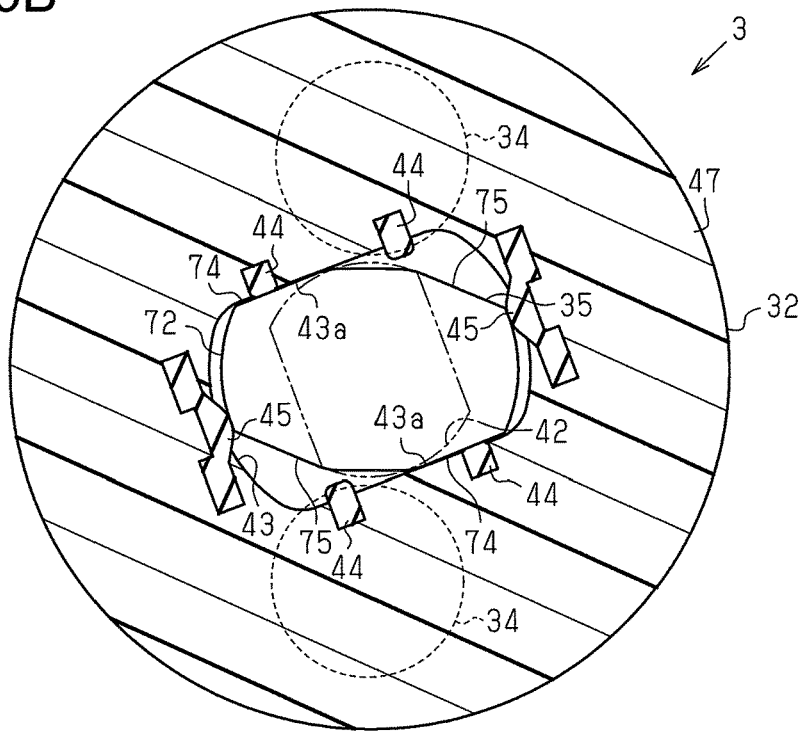

As shown in FIG. 9B, when the coupling member 32 is further rotated and driven by the rotation shaft 7, the dampers 44 located between the first driven transmission surface 74 and the coupling member 32 are pushed and elastically deformed, and the drive transmission surfaces 43a abut against the first driven transmission surfaces 74 in the rotation direction. That is, the drive transmission surfaces 43a of the coupling member 32 and the first driven transmission surfaces 74 of the driven insertion portion 72 are engaged in the rotation direction. This allows the rotation drive force to be transmitted from the coupling member 32 to the driven insertion portion 72 through the drive transmission surfaces 43a and the first driven transmission surfaces 74. Thus, the coupling member 32 and the driven rotor 35 are rotated about the center axis of the driven rotor 35 (same as center axis L2 of worm 24). As shown in FIG. 9A, the support 33 is pushed by the roller release units 48 and rotated integrally with the coupling member 32. In other words, rotation drive force is transmitted from the roller release units 48, and the support 33 and the coupling member 32 integrally rotate with the rotation shaft 7 about the center axis L1 of the rotation shaft 7. Thus, the rollers 34 are guided by the support 33 and rotated with the coupling member 32 and the driven rotor 35. More specifically, each roller 34 is held by the roller supports 62 and arranged at the circumferentially central part of the corresponding control surface 73. The rollers 34 are not held between the inner circumferential surface of the clutch housing 31 and the control surfaces 73. Instead, the rollers 34 are held by the support 33 and rotated with the driven rotor 35 about the center axis of the driven rotor 35.

Referring to FIG. 1, when the worm 24 rotates as the driven rotor 35 rotates, the rotation is reduced in speed by the worm 24 and the worm wheel 27 and then output from the output shaft 28. FIGS. 8A, 8B, 9A, and 9B each show the clutch 3 when the coupling member 32 is rotated in the counterclockwise direction. When the coupling member 32 is rotated in the clockwise direction, the rotation drive force is transmitted from the coupling member 32 to the driven insertion portion 72 in the same manner. In FIGS. 8A, 8B, 9A, and 9B, when the coupling member 32 is rotated in the clockwise direction, the drive transmission surfaces 43a abut against the second driven transmission surfaces 75.

The operation of the present embodiment will now be described.

The distal portion of each roller release unit 48 of the coupling member 32 and the roller support 62 of the support 33 are inserted into the grease accommodation portion S, in which grease is arranged. Thus, grease easily collects on the distal end of each roller release unit 48 of the coupling member 32 and the roller support 62 of the support 33. Further, the coupling member 32 and the support 33 rotate with the rotation shaft 7 about the center axis L1 of the rotation shaft 7. Thus, as shown in FIG. 6, grease (not shown in FIG. 6) may leak through the opening of the grease accommodation portion S out of the grease accommodation portion S. In addition, when the roller release units 48 are inserted into the grease accommodation portion S during manufacturing of the motor, the grease moved by the roller release units 48 may leak through the opening of the grease accommodation portion S out of the grease accommodation portion S. As shown by the arrow X in FIG. 6, most of the grease that leaks through the opening out of the grease accommodation portion S moves in the axial direction via the ring 61 of the support 33 toward the radially outer side on the axial end surface of the ring 61 that is opposite to the clutch housing 31. The coupling member leakage restriction wall 51 and the support leakage restriction wall 65 are located at a right angle on the movement path of grease that moves toward the radially outer side on the axial end surface of the ring 61 that is opposite to the clutch housing 31. Thus, the coupling member leakage restriction wall 51 and the support leakage restriction wall 65 restrict further movement of grease that moves to the radially outer side on the axial end surface of the ring 61 that is opposite to the clutch housing 31.

The present embodiment has the advantages described below.

(1) Grease arranged on the clutch housing 31 (grease accommodation portion S) easily collects on the coupling member 32 in which the roller release units 48 are inserted into the clutch housing 31 (grease accommodation portion S). Further, grease arranged on the clutch housing 31 (grease accommodation portion S) collects on the support 33 in which the roller supports 62 and the reinforcement portions 63 are inserted into the clutch housing 31 (grease accommodation portion S). When the coupling member 32 and the support 33 rotate with the rotation shaft 7 and grease collected on the coupling member 32 and the support 33 is moved to the radially outer side of the rotation shaft 7 by centrifugal force, the coupling member leakage restriction wall 51 and the support leakage restriction wall 65 restrict further movement of the grease toward the radially outer side. Thus, leakage of grease out of the clutch 3 is restricted. This avoids a shortage of grease arranged on the inner circumferential surface of the clutch housing 31. Accordingly, when rotation of the rotation shaft 7 caused by the worm 24 is restricted, the rollers 34 are securely held by the inner circumferential surface of the clutch housing 31 and the control surfaces 73 of the driven rotor 35.

(2) The ring 61 of the support 33 is located between the opening of the grease accommodation portion S (that is, opening of clutch housing 31 formed at fixing flange 31a) and the support leakage restriction wall 65 and continuous in the axial direction with the opening of the grease accommodation portion S and the support leakage restriction wall 65. Thus, the support 33 is continuous in the axial direction from the opening of the grease accommodation portion S to the support leakage restriction wall 65. Accordingly, when grease leaks through the opening of the grease accommodation portion S out of the grease accommodation S, the ring 61 restricts leakage of the grease out of the clutch 3 from between the opening of the grease accommodation portion S and the support leakage restriction wall 65. Thus, the leakage of the grease out of the clutch 3 is easily restricted by the support leakage restriction wall 65.

(3) In the clutch 3, when the rotation shaft 7 is stopped, the coupling member 32 and the support 33 are stopped. Thus, when rotation and drive of the rotation shaft 7 is stopped, the coupling member 32 and the support 33 that have been rotated with the rotation shaft 7 may be suddenly stopped. In such a case, grease that collects on the coupling member 32 and the support 33 may be diffused to the outer circumference by inertial force. Thus, in the clutch 3, since the coupling member 32 includes the coupling member leakage restriction wall 51 and the support 33 includes the support leakage restriction wall 65, leakage of grease out of the clutch 3 is effectively restricted.

(4) The annular ring 61 abuts against the fixing flange 31a of the clutch housing 31, which is located at the radially outer side of the opening of the grease accommodation portion S, from the axial direction. The support leakage restriction wall 65 is located on the ring 61. Most of the grease arranged in the grease accommodation portion S moves in the axial direction from the opening of the grease accommodation portion S (that is, opening of clutch housing 31 located at fixing flange 31a) via the ring 61 and moves to the radially outer side via the surface of the ring 61 located at the side opposite to the clutch housing 31. In the present embodiment, the ring 61, which abuts against the fixing flange 31a of the clutch housing 31 from the axial direction at the outer circumference of the opening of the grease accommodation portion S, includes the support leakage restriction wall 65 that projects away from the clutch housing 31 in the axial direction of the rotation shaft 7. Thus, the support leakage restriction wall 65 effectively restricts leakage of the grease, which moves from the opening of the grease accommodation portion S to the radially outer side via the ring 61, out of the clutch 3.

(5) The coupling member leakage restriction wall 51 and the support leakage restriction wall 65 project in the opposite directions and overlap with each other in the radial direction of the rotation shaft 7. The support leakage restriction wall 65 (ring 61) and the coupling member leakage restriction wall 51 form the labyrinth structure 67 including the clearance 66, which has an L-shaped cross section that is orthogonal to the circumferential direction of the rotation shaft 7. Thus, the coupling member leakage restriction wall 51 and the support leakage restriction wall 65 further effectively restrict leakage of grease out of the clutch 3. In addition, the leakage of grease out of the clutch 3 is further restricted by the clearance located between the outer circumferential surface of the coupling member leakage restriction wall 51 and the inner circumferential surface of the support leakage restriction wall 65.

(6) Each roller release unit 48 includes the inner circumferential surface Sa of the grease accommodation portion S (that is, inner circumferential surface of clutch housing 31) and the radially outer side surface 48c that opposes in the radial direction of the rotation shaft 7. The radially outer side surface 48c of each roller release unit 48 includes the accommodation groove 49 that accommodates grease. Thus, when the coupling member 32 rotates, grease accommodated in the accommodation groove 49 is moved to the radially outer side of the rotation shaft 7 by centrifugal force that acts on the grease when the coupling member 32 rotates. Accordingly, when the coupling member 32 rotates, grease can be supplemented from the accommodation groove 49 to the grease accommodation portion S.

(7) The coupling member leakage restriction wall 51 and the support leakage restriction wall 65 each have an annular shape that is continuous in the circumferential direction. Thus, even when grease leaks from any circumferential position of the opening of the grease accommodation portion S, the leakage of the grease out of the clutch 3 is restricted by the coupling member leakage restriction wall 51 and the support leakage restriction wall 65.

(8) The motor of the present embodiment is fixed to a vehicle with the output unit 2 located closer to the ground than the motor unit 1. Thus, in the motor fixed to the vehicle, the support 33 including the support leakage restriction wall 65 is located closer to the ground than the coupling member 32 including the coupling member leakage restriction wall 51. That is, among the coupling member 32 and the support 33, the support 33 located closer to the ground includes the support leakage restriction wall 65 that is located at the radially outer side of the coupling member leakage restriction wall 51 of the coupling member 32. The gap of the outer circumferential surface of the coupling member leakage restriction wall 51 and the inner circumferential surface of the support leakage restriction wall 65 opens toward the upper side. Thus, among the coupling member 32 and the support 33, the support leakage restriction wall 65 of the support 33 located closer to the ground further restricts leakage of grease out of the clutch 3 than when the support leakage restriction wall 65 of the support 33 is located at the radially inner side of the coupling member leakage restriction wall 51 of the coupling member 32.

(9) When the motor is manufactured, the arranging process is performed to arrange grease on the grease accommodation portion S, and the insertion process is then performed so that the roller release units 48 are inserted into the grease accommodation portion S (clutch housing 31). In the insertion process, when the roller release units 48 are inserted into the grease accommodation portion S, the grease arranged on the grease accommodation portion S is introduced to the accommodation groove 49. This facilitates application of grease to the accommodation groove 49. Further, when the roller release units 48 are inserted into the grease accommodation portion S, the grease arranged on the grease accommodation portion S is introduced to the accommodation groove 49 to reduce the grease that is moved by the roller release units 48 in the grease accommodation portion S. This reduces the grease that leaks through the opening of the grease accommodation portion S out of the grease accommodation portion S when the roller release units 48 are inserted into the grease accommodation portion S.

(10) The coupling member leakage restriction wall 51 and the support leakage restriction wall 65 restrict leakage of grease out of the clutch 3. This restricts collection of the grease of the clutch 3 on the components of the motor other than the clutch 3.

(11) The leakage of grease out of the clutch 3 is restricted just by changing the shapes of resin molding components of the components of the clutch 3 such as the coupling member 32 and the support 33, without changing the shapes of the components of the motor other than the clutch 3. This allows for easy arrangement of a structure that restricts leakage of grease out of the clutch 3 (that is, coupling member leakage restriction wall 51 and support leakage restriction wall 65).

The above embodiment may be modified as follows.

In the above embodiment, when the motor is coupled, the roller release units 48 are inserted into the clutch housing 31 (grease accommodation portion S) and the grease arranged on the inner surface of the grease accommodation portion S is introduced to the accommodation grooves 49. Instead, the accommodation grooves 49 may be filled with grease in advance before the roller release units 48 are inserted into the clutch housing 31.

In the above embodiment, grease is arranged on the grease accommodation portion S after the support 33 is inserted into the clutch housing 31. Instead, grease may be applied to the inner circumferential surface of the clutch housing 31 in advance before the support 33 is inserted into the clutch housing 31.

In the above embodiment, the coupling member leakage restriction wall 51 and the support leakage restriction wall 65 each have an annular shape that is continuous in the circumferential direction of the rotation shaft 7. However, the coupling member leakage restriction wall 51 and the support leakage restriction wall 65 do not have to be annular and may extend continuously around the circumferential direction of the rotation shaft 7. Such a structure still has the same advantage as advantage (7) described above. Further, the coupling member leakage restriction wall 51 and the support leakage restriction wall 65 do not have to extend continuously around the circumferential direction of the rotation shaft 7. For example, the coupling member leakage restriction wall 51 and the support leakage restriction wall 65 each having an arcuate shape that extends in the circumferential direction of the rotation shaft 7 may be non-continuous in the circumferential direction of the rotation shaft 7.

In the above embodiment, each accommodation groove 49 extends straight to the distal end of the corresponding roller release unit 48 in the axial direction of the rotation shaft 7. Instead, the accommodation groove 49 may be extended and inclined with respect to the axial direction or the circumferential direction of the rotation shaft 7. Alternatively, the accommodation groove 49 may extend in the circumferential direction of the rotation shaft 7. As another option, the accommodation groove 49 does not have to extend to the distal end of the roller release unit 48. As a further option, the accommodation groove 49 does not have to extend straight. As a still another option, each roller release unit 48 may include a plurality of accommodation grooves 49.

Figure 10A:
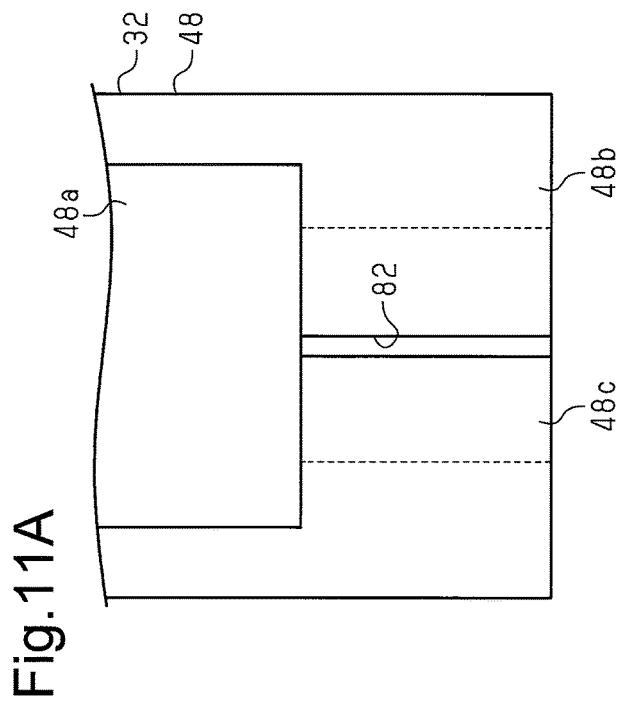
FIG. 10A is a front view showing a roller release unit in another embodiment.
Figure 10B:
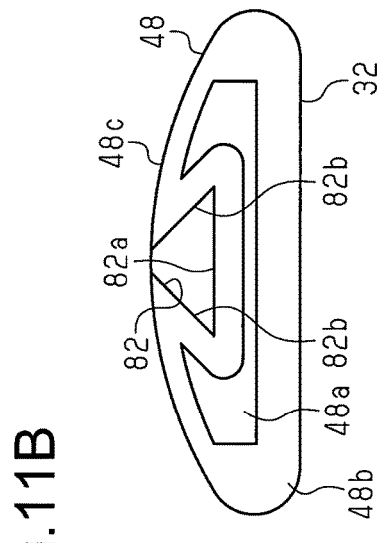
FIG. 10B is a bottom view of the roller release unit shown in FIG. 10A.

As shown in FIGS. 10A and 10B, the roller release unit 48 may include an accommodation groove 81 instead of the accommodation groove 49 of the above embodiment. The accommodation groove 81 extends in the axial direction of the rotation shaft 7 (vertical direction in FIG. 10A) from the distal end of the roller release unit 48 toward the basal end of the roller release unit 48. In this example, the accommodation groove 81 is located at the portion of the radially outer side surface 48c of the roller release unit 48 that includes the power transmission portion 48a. The accommodation groove 81 opens at the radially outer side and one axial side (that is, distal side of roller release unit 48). The portion of the accommodation groove 81 located closer to the basal end of the roller release unit 48 has a fixed width in the circumferential direction (sideward direction in FIG. 10A). The end of the accommodation groove 81 located at the distal side of the roller release unit 48 has a large circumferential width toward the distal end of the roller release unit 48 and thus increases in thickness toward the distal end of the roller release unit 48.

When the clutch 3 is coupled, grease is arranged on the inner surface of the grease accommodation portion S, and the roller release unit 48 is then inserted into the clutch housing 31 (inside grease accommodation portion S) from the distal end of the roller release unit 48 so that the coupling member 32 is coupled to the clutch housing 31 and the support 33. Under this situation, when the roller release unit 48 is inserted into the clutch housing 31 (grease accommodation portion S), the grease arranged on the inner surface of the grease accommodation S is introduced to the accommodation groove 81. In this example, the end of the accommodation groove 81 located at the distal side of the roller release unit 48 increases in thickness toward the distal end of the roller release unit 48. Thus, when the roller release unit 48 is inserted into the clutch housing 31 (grease accommodation portion S), the grease arranged on the inner surface of the grease accommodation portion S is easily introduced to the accommodation groove 81. This further facilitates application of grease to the accommodation groove 81.

The end of the accommodation groove 81 located at the distal side of the roller release unit 48 may have the form of a truncated cone, a polygonal cone, or the like to increase in thickness toward the distal end of the roller release unit 48. Alternatively, the radial width of the end of the accommodation groove 81 located closer to the distal side of the roller release unit 48 may increase toward the distal end of the roller release unit 48 so that the end of the accommodation groove 81 located at the distal side of the roller release unit 48 increases in thickness toward the distal end of the roller release unit 48.

Figure 11A:
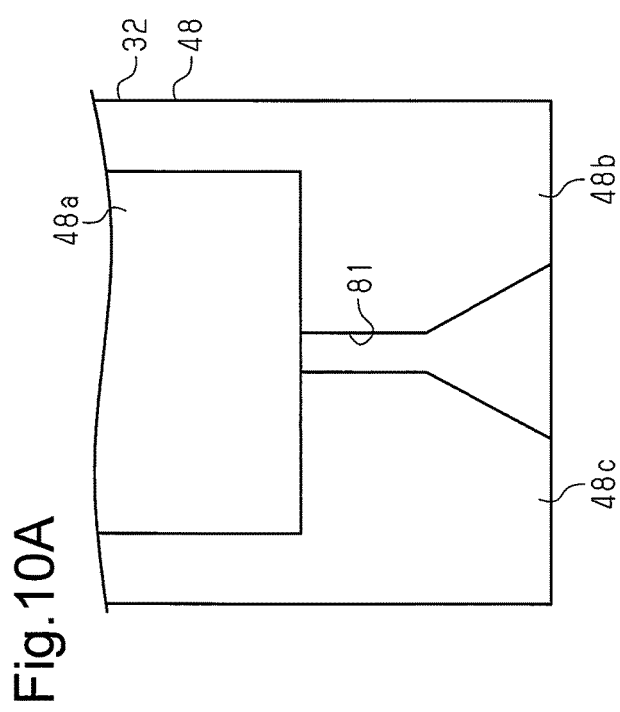
FIG. 11A is a front view showing a roller release unit in a further embodiment.
Figure 11B:
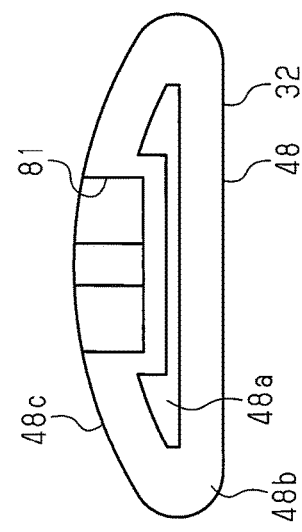
FIG. 11B is a bottom view of the roller release unit shown in FIG. 11A.

As shown in FIGS. 11A and 11B, the roller release unit 48 may include an accommodation groove 82 instead of the accommodation groove 49 of the above embodiment. The accommodation groove 82 extends straight from the distal end of the roller release unit 48 in the axial direction of the rotation shaft 7 (vertical direction in FIG. 10A). In this example, the accommodation groove 82 is located at the portion of the radially outer side surface 48c of the roller release unit 48 where the power transmission portion 48a is arranged. The accommodation groove 82 opens at the radially outer side and one axial side (that is, distal side of roller release unit 48). The inner circumferential surface of the accommodation groove 82 includes a flat bottom surface 82a, which is orthogonal to the radial direction, and two adjustment surfaces 82b, which respectively extend from the two circumferential ends of the bottom surface 82a toward the radially outer side. That is, the two inner side surfaces in the circumferential direction of the accommodation groove 82 are the two adjustment surfaces 82b. The two adjustment surfaces 82b each have a flat surface inclined with respect to the radial direction of the rotation shaft 7 (vertical direction in FIG. 11B) so that the two adjustment surfaces 82b is proximate to the circumferential direction from the bottom of the accommodation groove 82 toward the opening of the radially outer side of the accommodation groove 82. The two adjustment surfaces 82b are parallel to the axial direction of the rotation shaft 7. The two adjustment surfaces 82b change the width of the accommodation groove 82 in the circumferential direction of the rotation shaft 7 so that the width gradually decreases from the bottom of the radially inner side of the accommodation groove 82 toward the opening of the radially outer side of the accommodation groove 82. Thus, the cross section of the accommodation groove 82 that is orthogonal to the axial direction of the rotation shaft 7 has a trapezoidal shape in which the circumferential width decreases toward the radially outer side.

Some of the grease that is moved to the radially outer side of the rotation shaft 7 in the accommodation groove 82 by centrifugal force that acts when the rotation shaft 7 rotates with the coupling member 32 as the coupling member 32 rotates is moved via the adjustment surfaces 82b. The ease of movement of grease to the radially outer side changes depending on the degree of inclination of the adjustment surfaces 82b with respect to the radial direction of the rotation shaft 7. Further, the ease of supply of grease from the accommodation groove 82 to the inner circumferential surface Sa of the grease accommodation portion S changes depending on the circumferential width of the opening of the radially outer side of the accommodation groove 82. The circumferential width of the opening of the radially outer side of the accommodation groove 82 can be changed by adjusting the degree of inclination of the adjustment surfaces 82b with respect to the radial direction of the rotation shaft 7. Thus, the amount of supply of grease from the accommodation groove 82 to the inner circumferential surface Sa of the grease accommodation portion S can be easily adjusted by adjusting the degree of inclination of the adjustment surfaces 82b with respect to the radial direction of the rotation shaft 7. In the examples of FIGS. 11A and 11B, the accommodation groove 82 includes the two adjustment surfaces 82b so that the width of the opening of the radially outer side of the accommodation groove 82 in the circumferential direction of the rotation shaft 7 is smaller than the width of the bottom surface 82a in the circumferential direction of the rotation shaft 7. Thus, as compared to when the two circumferential side surfaces of the accommodation groove 82 are parallel to the radial direction of the rotation shaft 7, grease is gradually supplied from the accommodation groove 82 to the inner circumferential surface Sa of the grease accommodation portion S.

In the examples of FIGS. 11A and 11B, the two circumferential inner side surfaces of the accommodation groove 82 are the adjustment surfaces 82b. However, only one of the two circumferential inner side surfaces of the accommodation groove 82 may be the adjustment surface 82b. Alternatively, at least one of the two circumferential inner side surfaces of the accommodation groove 82 may partially include the adjustment surface 82b.

The roller release unit 48 does not have to include the accommodation groove 49.

In the above embodiment, the support leakage restriction wall 65 is closer to the radially outer side of the rotation shaft 7 than the coupling member leakage restriction wall 51. However, the support leakage restriction wall 65 may be closer to the radially inner side of the rotation shaft 7 than the coupling member leakage restriction wall 51. Alternatively, the coupling member leakage restriction wall 51 and the support leakage restriction wall 65 do not have to overlap with each other in the radial direction of the rotation shaft 7.

In the above embodiment, the clutch 3 includes two leakage restriction walls, namely, the coupling member leakage restriction wall 51 and the support leakage restriction wall 65. However, the clutch 3 may include only one of the coupling member leakage restriction wall 51 and the support leakage restriction wall 65.

The ring 61 does not have to abut against the fixing flange 31a of the clutch housing 31 from the axial direction.

In the above embodiment, the clutch 3 functions to transmit rotation drive force of the rotation shaft 7 to the worm 24 and restrict transmission of rotation drive force from the worm 24 to the rotation shaft 7, and the rotation of the coupling member 32 and the support 33 is stopped when the rotation shaft 7 is stopped. However, a coupling portion that couples the rotation shaft 7 to the worm 24 to transmit the rotation drive force of the rotation shaft 7 to the worm 24 is not limited to the clutch 3 of the above embodiment. For example, the coupling portion may be a clutch that functions to transmit the rotation drive force of the rotation shaft 7 to the worm 24 and restrict transmission of the rotation force from the worm 24 to the rotation shaft 7 when the worm 24 rotates freely relative to the rotation shaft 7 during non-rotation drive of the rotation shaft 7. Alternatively, the coupling portion does not have to function to restrict transmission of the rotation force from the worm 24 to the rotation shaft 7. In any of the examples, the coupling portion includes a rotation member that is at least partially inserted into a grease accommodation portion of the coupling portion and rotated with the rotation shaft 7 about the center axis L1 of the rotation shaft 7. The number of rotation members may be one or more. Further, at least one rotation member includes a leakage restriction wall including a portion located toward the outer side of the rotation shaft 7 from an opening of the grease accommodation portion and projected further in the axial direction of the rotation shaft 7 at the radially outer side of the rotation shaft 7 than the opening of the grease accommodation portion.

In the above embodiment, grease is used to increase the sliding friction between the inner circumferential surface of the clutch housing 31 and the rollers 34. However, grease has only to assist smooth operation of the coupling portion at a position of the coupling portion on which the grease is arranged. For example, grease that allows for smooth sliding of the components of the coupling portion may be used so that the coupling portion operates smoothly.

In the above embodiment, the motor is fixed to a vehicle with the output unit 2 located closer to the ground than the motor unit 1. However, the direction of the motor with the motor fixed to a fixed position may be changed in accordance with the position at which the motor is fixed.

The output unit 2 does not have to include the reduction drive 22. The output unit 2 has only to include a driven shaft to which rotation of the rotation shaft 7 is transmitted and which outputs rotation drive force transmitted to the driven shaft to the outside.

The invention claimed is:

1. A clutch that transmits rotation drive force of a rotation shaft to a driven shaft and restricts transmission of a rotation force from the driven shaft to the rotation shaft, the clutch comprising:
a grease accommodation portion in which grease is arranged, wherein the grease accommodation portion includes an opening that opens in an axial direction of the rotation shaft; and
a rotation member that is at least partially inserted into the grease accommodation portion and rotated with the rotation shaft about a center axis of the rotation shaft, wherein
the rotation member includes a leakage restriction wall that is located toward a radially outer side of the rotation shaft from the opening of the grease accommodation portion and extended in the axial direction of the rotation shaft, and
the leakage restriction wall is located toward an outer side of the grease accommodation portion from the opening of the grease accommodation portion,
the grease accommodation portion includes a tubular inner circumferential surface on which the grease is arranged, wherein the tubular inner circumferential surface is directed toward a radially inner side of the rotation shaft,
the rotation member includes a first rotation member that rotates integrally with the rotation shaft and a second rotation member to which rotation drive force is transmitted from the first rotation member,
the leakage restriction wall is arranged on the first rotation member and the second rotation member,
the first rotation member includes a rotation transmission unit extended in the axial direction of the rotation shaft and inserted into the grease accommodation portion to transmit rotation drive force to the second rotation member,
the rotation transmission unit includes a radially outer side surface that opposes the inner circumferential surface of the grease accommodation portion in the radial direction of the rotation shaft, and
the radially outer side surface of the rotation transmission unit includes an accommodation groove that accommodates the grease.

2. The clutch according to claim 1, wherein
the rotation member includes an axially continuous portion located between the opening of the grease accommodation portion and the leakage restriction wall, and
the axially continuous portion is continuous in the axial direction with the opening of the grease accommodation portion and the leakage restriction wall.

3. The clutch according to claim 1, wherein rotation of the rotation member is stopped when the rotation shaft is stopped.

4. The clutch according to claim 3, further comprising a tubular clutch housing that includes the grease accommodation portion, wherein
the rotation member includes an annular ring that abuts against, from the axial direction, a portion of the clutch housing located at a radially outer side of the opening of the grease accommodation portion, and
the leakage restriction wall is located on the ring and projected away from the clutch housing in the axial direction of the rotation shaft.

5. The clutch according to claim 1, wherein
the rotation member includes a first rotation member that rotates integrally with the rotation shaft and a second rotation member to which rotation drive force is transmitted from the first rotation member,
the leakage restriction wall includes a first leakage restriction wall and a second leakage restriction wall,
the first rotation member includes the first leakage restriction wall,
the second rotation member includes the second leakage restriction wall,
the second leakage restriction wall and the first leakage restriction wall project in opposite directions, and
the second leakage restriction wall is arranged to overlap the first leakage restriction wall in the radial direction of the rotation shaft.

6. The clutch according to claim 1, wherein
the accommodation groove includes two inner side surfaces located at opposite sides of the rotation shaft in a circumferential direction, a bottom, and an opening,
at least one of the two inner side surfaces includes an adjustment surface inclined with respect to the radial direction of the rotation shaft, and
the adjustment surface extends to change a width of the accommodation groove in the circumferential direction of the rotation shaft from the bottom toward the opening.

7. The clutch according to claim 1, wherein
the accommodation groove extends to a distal end of the rotation transmission unit in the axial direction of the rotation shaft, and
an end of the accommodation groove located at a distal side of the rotation transmission unit increases in thickness toward the distal end of the rotation transmission unit.

8. The clutch according to claim 1, wherein the leakage restriction wall is annular and continuous in a circumferential direction.

9. A motor comprising:
a motor unit including a rotation shaft that is driven and rotated;
an output unit including a driven shaft to which rotation drive force of the rotation shaft is transmitted, wherein the output unit externally outputs the rotation drive force transmitted to the driven shaft; and
a coupling portion including a grease accommodation portion and a rotation member, wherein grease is arranged in the grease accommodation portion, the grease accommodation portion includes an opening that opens in an axial direction of the rotation shaft, the rotation member is at least partially inserted into the grease accommodation portion and rotated with the rotation shaft about a center axis of the rotation shaft and the coupling portion couples the rotation shaft to the driven shaft to transmit the rotation drive force of the rotation shaft to the driven shaft, wherein
the rotation member includes a leakage restriction wall that is located toward a radially outer side of the rotation shaft from the opening of the grease accommodation portion and extended in the axial direction of the rotation shaft, and
the leakage restriction wall is located toward an outer side of the grease accommodation portion from the opening of the grease accommodation portion, and the coupling portion and the leakage restriction wall form a clearance, which has an L-shaped cross-section that is orthogonal to a circumferential direction of the rotation shaft.

10. The motor according to claim 9, wherein
the rotation member includes an axially continuous portion located between the opening of the grease accommodation portion and the leakage restriction wall, and
the axially continuous portion is continuous in the axial direction with the opening of the grease accommodation portion and the leakage restriction wall.

11. The motor according to claim 9, wherein
the coupling portion transmits the rotation drive force of the rotation shaft to the driven shaft and restricts transmission of a rotation force from the driven shaft to the rotation shaft, and
rotation of the rotation member is stopped when the rotation shaft is stopped.

12. The motor according to claim 11, wherein
the clutch includes a tubular clutch housing that includes the grease accommodation portion, the rotation member includes an annular ring that abuts against, from the axial direction, a portion of the clutch housing located at a radially outer side of the opening of the grease accommodation portion, and
the leakage restriction wall is located on the ring and projected away from the clutch housing in the axial direction of the rotation shaft.

13. The motor according to claim 9, wherein
the rotation member includes a first rotation member that rotates integrally with the rotation shaft and a second rotation member to which rotation drive force is transmitted from the first rotation member,
the leakage restriction wall includes a first leakage restriction wall and a second leakage restriction wall,
the first rotation member includes the first leakage restriction wall,
the second rotation member includes the second leakage restriction wall,
the second leakage restriction wall and the first leakage restriction wall project in opposite directions, and
the second leakage restriction wall is arranged to overlap the first leakage restriction wall in the radial direction of the rotation shaft.

14. The motor according to claim 9, wherein
the grease accommodation portion includes a tubular inner circumferential surface on which the grease is arranged, wherein the grease accommodation portion is directed toward a radially inner side of the rotation shaft,
the rotation member includes a first rotation member that rotates integrally with the rotation shaft and a second rotation member to which rotation drive force is transmitted from the first rotation member,
the leakage restriction wall is located on the first rotation member and the second rotation member, the first rotation member includes a rotation transmission unit extended in the axial direction of the rotation shaft and inserted into the grease accommodation portion to transmit rotation drive force to the second rotation member,
the rotation transmission unit includes a radially outer side surface that opposes the inner circumferential surface of the grease accommodation portion in the radial direction of the rotation shaft, and the radially outer side surface of the rotation transmission unit includes an accommodation groove that accommodates the grease.

15. The motor according to claim 14, wherein
the accommodation groove includes two inner side surfaces located at opposite sides of the rotation shaft in a circumferential direction, a bottom, and an opening,
at least one of the two inner side surfaces includes an adjustment surface inclined with respect to the radial direction of the rotation shaft, and
the adjustment surface extends to change a width of the accommodation groove in the circumferential direction of the rotation shaft from the bottom toward the opening.

16. The motor according to claim 14, wherein
the accommodation groove extends to a distal end of the rotation transmission unit in the axial direction of the rotation shaft, and
an end of the accommodation groove located at a distal side of the rotation transmission unit increases in thickness toward the distal end of the rotation transmission unit.

17. The motor according to claim 9, wherein the leakage restriction wall is annular and continuous in a circumferential direction.

18. A method for manufacturing a motor,
the motor including:
a motor unit including a rotation shaft that is driven and rotated;
an output unit including a driven shaft to which rotation drive force of the rotation shaft is transmitted, wherein the output unit externally outputs the rotation drive force transmitted to the driven shaft; and
a coupling portion including a grease accommodation portion and a rotation member, wherein grease is arranged in the grease accommodation portion, the grease accommodation portion includes an opening that opens in an axial direction of the rotation shaft, the rotation member is at least partially inserted into the grease accommodation portion and rotated with the rotation shaft about a center axis of the rotation shaft and the coupling portion couples the rotation shaft to the driven shaft to transmit the rotation drive force of the rotation shaft to the driven shaft, wherein
the rotation member includes a leakage restriction wall that is located toward a radially outer side of the rotation shaft from the opening of the grease accommodation portion and extended in the axial direction of the rotation shaft,
the leakage restriction wall is located toward an outer side of the grease accommodation portion from the opening of the grease accommodation portion,
the grease accommodation portion includes a tubular inner circumferential surface on which the grease is arranged, wherein the tubular inner circumferential surface is directed toward a radially inner side of the rotation shaft,
the rotation member is at least one of a first rotation member that rotates integrally with the rotation shaft and a second rotation member to which rotation drive force is transmitted from the first rotation member,
the leakage restriction wall is arranged on at least one of the first rotation member and the second rotation member,
the first rotation member includes a rotation transmission unit extended in the axial direction of the rotation shaft and inserted into the grease accommodation portion to transmit rotation drive force to the second rotation member, the rotation transmission unit includes a radially outer side surface that opposes the inner circumferential surface of the grease accommodation portion in the radial direction of the rotation shaft, the radially outer side surface of the rotation transmission unit includes an accommodation groove that accommodates the grease, and the method comprising:

arranging the grease in the grease accommodation portion; and inserting the rotation transmission unit into the grease accommodation portion, wherein the insertion of the rotation transmission unit into the grease accommodation portion introduces the grease arranged in the grease accommodation portion to the accommodation groove.

* * * * *